United States Patent
Cheng et al.

(10) Patent No.: US 11,322,778 B2
(45) Date of Patent: May 3, 2022

(54) HIGH VOLTAGE ELECTROLYTE ADDITIVES

(71) Applicant: Wildcat Discovery Technologies, Inc., San Diego, CA (US)

(72) Inventors: Gang Cheng, San Diego, CA (US); Jinhua Huang, San Diego, CA (US); Ye Zhu, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 95 days.

(21) Appl. No.: 15/991,899

(22) Filed: May 29, 2018

(65) Prior Publication Data

US 2019/0372161 A1  Dec. 5, 2019

(51) Int. Cl.
| | |
|---|---|
| *H01M 10/0567* | (2010.01) |
| *H01M 10/0525* | (2010.01) |
| *H01M 10/42* | (2006.01) |
| *H01M 4/525* | (2010.01) |

(52) U.S. Cl.
CPC ....... *H01M 10/0567* (2013.01); *H01M 4/525* (2013.01); *H01M 10/0525* (2013.01); *H01M 10/4235* (2013.01); *H01M 2300/0025* (2013.01)

(58) Field of Classification Search
CPC ......... H01M 10/0567; H01M 10/4235; H01M 10/0524; H01M 2300/0025
See application file for complete search history.

(56) References Cited

U.S. PATENT DOCUMENTS

| | | | |
|---|---|---|---|
| 5,830,600 | A | 11/1998 | Narang et al. |
| 5,869,208 | A | 2/1999 | Miyasaka |
| 5,874,018 | A | 2/1999 | Ferrar et al. |
| 6,077,628 | A | 6/2000 | Takechi et al. |
| 6,203,942 | B1 | 3/2001 | Gan et al. |
| 6,235,431 | B1 | 5/2001 | Takechi et al. |
| 6,350,546 | B1 | 2/2002 | Gan et al. |
| 6,379,846 | B1 | 4/2002 | Terahara et al. |
| 6,416,901 | B1 | 7/2002 | Fauteux et al. |
| 6,485,868 | B1 | 11/2002 | Tsujioka et al. |
| 6,680,147 | B2 | 1/2004 | Lee |
| 6,797,437 | B2 | 9/2004 | Tsukamoto et al. |
| 6,806,004 | B1 | 10/2004 | Iwamoto et al. |

(Continued)

FOREIGN PATENT DOCUMENTS

| | | |
|---|---|---|
| CN | 101771167 A | 7/2010 |
| EP | 1037293 A1 | 9/2000 |

(Continued)

OTHER PUBLICATIONS

Machine translation of WO-2017138453-A1 (Year: 2017).*

(Continued)

*Primary Examiner* — Eugenia Wang
(74) *Attorney, Agent, or Firm* — Young Basile Hanlon & MacFarlane, P.C.

(57) ABSTRACT

Described herein are additives for use in electrolytes that provide a number of desirable characteristics when implemented within batteries, such as high capacity retention during battery cycling at high temperatures. In some embodiments, a high voltage electrolyte includes a base electrolyte and one or more vinylsilane or fluorosilane additives, which impart these desirable performance characteristics.

14 Claims, 12 Drawing Sheets

(56) References Cited

U.S. PATENT DOCUMENTS

| | | |
|---|---|---|
| 6,872,493 B2 | 3/2005 | Yamada et al. |
| 6,887,619 B2 | 5/2005 | West et al. |
| 6,902,850 B2 | 6/2005 | Wariishi et al. |
| 6,995,225 B2 | 2/2006 | Arai et al. |
| 7,097,942 B2 | 8/2006 | Hwang et al. |
| 7,169,510 B2 | 1/2007 | Awano et al. |
| 7,211,353 B2 | 5/2007 | Kashida et al. |
| 7,226,702 B2 | 6/2007 | Oh et al. |
| 7,241,536 B2 | 7/2007 | Kim et al. |
| 7,252,908 B2 | 8/2007 | Kim et al. |
| 7,255,966 B2 | 8/2007 | Kim et al. |
| 7,351,501 B2 | 4/2008 | Jung et al. |
| 7,378,193 B2 | 5/2008 | Kang et al. |
| 7,410,731 B2 | 8/2008 | Yoon et al. |
| 7,419,747 B2 | 9/2008 | Utsugi et al. |
| 7,459,239 B2 | 12/2008 | Kashida et al. |
| 7,473,491 B1 | 1/2009 | Amine et al. |
| 7,494,746 B2 | 2/2009 | Tarnopolsky |
| 7,498,102 B2 | 3/2009 | Oh et al. |
| 7,588,859 B1 | 9/2009 | Oh et al. |
| 7,598,003 B1 | 10/2009 | Yoon et al. |
| 7,608,362 B2 | 10/2009 | Choi et al. |
| 7,622,220 B2 | 11/2009 | Kim et al. |
| 7,679,884 B2 | 3/2010 | West et al. |
| 7,695,860 B2 | 4/2010 | Amine et al. |
| 7,718,321 B2 | 5/2010 | Yoon et al. |
| 7,744,772 B2 | 6/2010 | Gambut-Garel et al. |
| 7,799,471 B2 | 9/2010 | Lee et al. |
| 7,803,487 B2 | 9/2010 | Shima |
| 7,833,665 B2 | 11/2010 | Mah et al. |
| 7,846,581 B2 | 12/2010 | Barrandon et al. |
| 7,846,588 B2 | 12/2010 | Jung et al. |
| 7,851,090 B2 | 12/2010 | Park et al. |
| 7,883,801 B2 | 2/2011 | Shimizu et al. |
| 8,000,084 B2 | 8/2011 | Siggel et al. |
| 8,128,833 B1 | 3/2012 | Smith et al. |
| 2003/0124432 A1 | 7/2003 | Miura et al. |
| 2004/0096737 A1 | 5/2004 | Kim et al. |
| 2004/0234865 A1 | 11/2004 | Sato et al. |
| 2006/0166100 A1 | 7/2006 | Takahashi et al. |
| 2006/0172200 A1 | 8/2006 | Yoon et al. |
| 2006/0269846 A1 | 11/2006 | Xu et al. |
| 2007/0212614 A1 | 9/2007 | Kim et al. |
| 2007/0224506 A1 | 9/2007 | Ooyama et al. |
| 2007/0298320 A1 | 12/2007 | Barrandon et al. |
| 2008/0134492 A1 | 6/2008 | Amine et al. |
| 2008/0138714 A1 | 6/2008 | Ihara et al. |
| 2008/0138715 A1 | 6/2008 | Ihara et al. |
| 2008/0166637 A1 | 7/2008 | Inagaki et al. |
| 2009/0027821 A1 | 1/2009 | Siggel et al. |
| 2009/0163394 A1 | 6/2009 | Muraishi et al. |
| 2009/0181311 A1 | 7/2009 | Iwanaga et al. |
| 2009/0191465 A1 | 7/2009 | Hwang et al. |
| 2009/0197167 A1 | 8/2009 | Olschimke |
| 2009/0202892 A1 | 8/2009 | Inagaki et al. |
| 2009/0202905 A1 | 8/2009 | Morita et al. |
| 2009/0253045 A1 | 10/2009 | Kotato et al. |
| 2009/0263726 A1 | 10/2009 | Yamaguchi et al. |
| 2009/0286155 A1 | 11/2009 | Takehara |
| 2009/0286157 A1 | 11/2009 | Chen et al. |
| 2009/0311609 A1 | 12/2009 | Saisho et al. |
| 2010/0015514 A1 | 1/2010 | Miyagi et al. |
| 2010/0035146 A1 | 2/2010 | Fujii et al. |
| 2010/0092863 A1 | 4/2010 | Kim |
| 2010/0099031 A1 | 4/2010 | Kato et al. |
| 2010/0119956 A1 | 5/2010 | Tokuda et al. |
| 2010/0159336 A1 | 6/2010 | Kim et al. |
| 2010/0183926 A1 | 7/2010 | Kim et al. |
| 2010/0216036 A1 | 8/2010 | Shima |
| 2010/0273045 A1 | 10/2010 | Hasegawa et al. |
| 2010/0304224 A1 | 12/2010 | Yoshimura et al. |
| 2010/0330433 A1 | 12/2010 | Amine et al. |
| 2011/0027663 A1 | 2/2011 | Ohkubo et al. |
| 2011/0059372 A1* | 3/2011 | Chiga .................. H01M 4/131 429/346 |
| 2011/0111294 A1 | 5/2011 | Lopez et al. |
| 2011/0123870 A1 | 5/2011 | Oh et al. |
| 2011/0136018 A1 | 6/2011 | Nogi et al. |
| 2011/0274985 A1 | 11/2011 | Usrey et al. |
| 2013/0029217 A1* | 1/2013 | Bhat ........................ H02J 7/00 429/188 |
| 2015/0171475 A1 | 6/2015 | Kondo et al. |
| 2017/0338488 A1* | 11/2017 | Sun ........................ C01G 53/00 |
| 2019/0020063 A1* | 1/2019 | Kim ................... H01M 10/0567 |

FOREIGN PATENT DOCUMENTS

| | | |
|---|---|---|
| EP | 1898485 A1 | 3/2008 |
| JP | H09283176 A | 10/1997 |
| JP | 2001057237 A | 2/2001 |
| JP | 2001313073 | 11/2001 |
| JP | 2007123097 A | 5/2007 |
| JP | 2007287491 A | 11/2007 |
| JP | 2008146930 A | 6/2008 |
| JP | 2009037868 A | 2/2009 |
| JP | 2010251313 A | 11/2010 |
| JP | 2011049152 A | 3/2011 |
| JP | 2011077029 A | 4/2011 |
| JP | 2013145702 A | 7/2013 |
| KR | 100813309 B1 | 3/2008 |
| KR | 20080110160 A | 12/2008 |
| KR | 1020150069459 A | 6/2015 |
| KR | 1020170110995 A | 10/2017 |
| KR | 1020180054499 A | 5/2018 |
| WO | 2000036683 A2 | 6/2000 |
| WO | 2011034067 A1 | 3/2011 |
| WO | 2012015241 A | 2/2012 |
| WO | 2013065723 A | 5/2013 |
| WO | WO-2016126095 A1 * | 8/2016 ............ H01M 4/139 |
| WO | WO-2017138453 A1 * | 8/2017 ........ H01M 10/0569 |
| WO | WO-2018093152 A1 * | 5/2018 ........ H01M 10/0568 |

OTHER PUBLICATIONS

Bouillon, Jean-Philippe, et al. "Synthesis and Intramolecular Adol Reactions of 1,6 and 1,7-Bis(acylsilanes)", European Journal of Organic Chemistry (1999) 1571-1580.

Fisher, Craig, et al., "Lithium Battery Materials $LiMPO_4$ (M = Mn, Fe, Co, and Ni): Insights into Defect Associateion, Transport Mechanisms, and Doping Behavior", Chemical Materials 2008, 20, 5907-5915.

Goodenough, John, et al., "Challenges for Rechargeable Li Batteries", Chemistry of Materials Review, 2010, 22, 587-603.

International Search Report dated Dec. 24, 2013 in International application No. PCT/JP2013/005935.

International Search Report & Written Opinion dated Sep. 18, 2012 in International application No. PCT/US2012/041352.

International Search Report & Written Opinion dated Dec. 2, 2013 in International application No. PCT/US2013/056893.

International Search Report & Written Opinion dated Nov. 8, 2013 in International application No. PCT/US2013/056889.

International Search Report & Written Opinion dated Oct. 16, 2012 in International application No. PCT/US2012/41363.

Johnson, Christopher S., et al. "Synthesis, Characterization and Electrochemistry of Lithium Battery Electrodes $xLi_2MnO_3$ $(1-x)$ $LiMn_{0.333}Ni_{0.333}Co_{0.333}O_2$" Chemical Materials, 2008, 20, 6095-6106.

Kang, S., et al., "Interpreting the structural and electrochemical complexity of $0.5Li_2MnO_3$—$0.5LiMO_2$ electrodes for lithium batteries" Journal of materials Chemistry, 2007, 17, 2069-2077.

Marom, Rotem, et al. "A review of advanced and practical lithium battery materials", Journal of Materials Chemistry, 2011, 21, 9938.

Nagahama, Masatoshi, "High Voltage Performances of $Li_2NiPO_4F$ Cathode with Dinitrile-Based Electrolytes", Journal of the Electrochemical Society, 157 (6) A748-A752 (2010).

Saleur, Damien, "First synthesis of 1 ,4-bis(acylsilanes)", Tetrahedron Letters 41 (2000) 321-324.

Supplementary European Search Report issued in European application No. EP12796608.3 dated Jun. 6, 2015.

(56) References Cited

OTHER PUBLICATIONS

Xu, Kang, et al., "Sulfone-based Electrolytes for Lithium-Ion Batteries", Journal of the Electrochemical Society, 149 (7) A920-A926 (2002).

Yi, Ting-Feng, et al., "Recent developments in the doping of LiNi0.5Mn1.5O4 cathode material for 5 V lithium-ion batteries", Ionics (2011) 17:383-389.

Lin, Zhi-Ping, et al., "Li-Site and Metal-Site Ion Doping in Phosphate-Olivine LiCoPO4 by First-Principles Calculation", Chin. Phys. Letters, vol. 26, No. 3 (2009) 038202.

International Search Report and Written Opinion for related International Patent Application No. PCT/US2019/034375 dated Sep. 19, 2019 (12 pages).

* cited by examiner

HIGH VOLTAGE ELECTROLYTE ADDITIVES

BACKGROUND OF THE INVENTION

The present invention is in the field of battery technology and, more particularly, in the area of additive compounds for use with high-energy electrodes in electrochemical cells.

A liquid electrolyte serves to transport ions between electrodes in a battery. Organic carbonate-based electrolytes are most commonly used in lithium-ion ("Li-ion") batteries and, more recently, efforts have been made to develop new classes of electrolytes based on sulfones, silanes, and nitriles. Unfortunately, these conventional electrolytes typically cannot be operated at high voltages, since they are unstable above 4.3 V or other high voltages. At high voltages, conventional electrolytes can decompose, for example, by catalytic oxidation in the presence of cathode materials, to produce undesirable products that affect both the performance and safety of a battery. Conventional electrolytes may also be degraded by reduction by the anodes when the cells are charged to high voltages, such as 4.3 V or above.

As described in more detail below, solvents, salts, or additives have been incorporated into the electrolyte to decompose on the electrode to form a protective film called a solid electrolyte interphase (SEI). Depending on the exact chemical system, this film can be composed of organic or inorganic lithium salts, organic molecules, oligomers, or polymers. Often, several components of the electrolyte are involved in the formation of the SEI (e.g., lithium salt, solvent, and additives). As a result, depending on the rate of decomposition of the different components, the SEI can be more or less homogenous.

In past research, organic compounds containing polymerizable functional groups such as alkenes, furan, thiophene, and pyrrole had been reported to form an SEI on the cathode of lithium ion batteries. See, e.g., Y.-S. Lee et al., *Journal of Power Sources* 196 (2011) 6997-7001. These additives likely undergo polymerization during cell charging to form passivation films on the electrodes. SEIs are known to contain high molecular weight species. However, in situ polymerization during the initial charge often cannot be controlled in a precise enough manner to prevent non-uniform SEIs comprised of polymer or oligomer mixtures with either heterogeneous molecular weight, heterogeneous composition, or even undesired adducts. The non-uniformity of the SEI often results in poor mechanical and electrochemical stability, which is believed to be a main cause of cycle life degradation in lithium ion batteries. Thus, the improvement in cell performance using these materials is limited.

Further, certain organic polymers have also been used as solid electrolytes for lithium ion batteries due to the generally low volatility and safety of polymeric molecules as compared to smaller organic molecules, such as organic carbonates. However, practical application of such systems has been limited due to poor ionic conductivity.

For high-energy cathode materials, electrolyte stability remains a challenge. Recently, the need for better performance and higher capacity lithium ion secondary batteries used for power sources is dramatically increasing. Lithium transition metal oxides such as $LiCoO_2$ ("LCO") and $LiNi_{0.33}Mn_{0.33}Co_{0.33}O_2$ ("NMC") are state-of-the-art high-energy cathode materials used in commercial batteries. Yet only about 50% of the theoretical capacity of LCO or NMC cathodes can be used with stable cycle life. To obtain the higher capacity, batteries containing these high-energy materials need to be operated at higher voltages, such as voltages up to about 4.7V. However, above about 4.3V, conventional electrolytes degrade and this leads to a significant deterioration of the cycle life. Further, the decomposition of the electrolyte at higher voltages can generate gas (such as $CO_2$, $O_2$, ethylene, $H_2$) and acidic products, both of which can damage a battery. These effects are further enhanced in "high nickel" NMC compositions such as $LiNi_{0.6}Mn_{0.2}Co_{0.2}O_2$ or $LiNi_{0.8}Mn_{0.1}Co_{0.1}O_2$ or others, which can provide higher capacities due to the electrochemistry of the nickel.

Many of these same challenges occur when a battery is operated at high temperature. That is, conventional electrolytes can decompose by oxidation or may be degraded by reduction at high temperature analogous to the way these mechanisms affect the electrolytes at high voltage. Other parasitic reactions can also occur at elevated temperature.

As disclosed herein, these challenges and others are addressed in high energy lithium ion secondary batteries including cathode active materials that are capable of operation at high voltage.

BRIEF SUMMARY OF THE INVENTION

Certain embodiments of the invention include a lithium ion battery having an anode, a cathode, and a liquid electrolyte. The liquid electrolyte is formulated from a lithium salt, a solvent, and an additive. The additive is represented by the formula $(M-R_x)_y$, where x is an integer from 1 to 5, y is an integer from 1 to 6, M comprises a metalloid moiety, and at least one $R_x$ comprises a vinyl moiety or a fluorine moiety. In some preferred embodiments, y=1. In certain embodiments, x=3 or x=4. In certain embodiments, more than one $R_x$ includes a vinyl moiety. In certain embodiments, at least three of $R_x$ include the same vinyl moiety. In certain embodiments, at least four of $R_x$ include the same vinyl moiety. In certain embodiments, each $R_x$ includes the same vinyl moiety. In certain embodiments, one $R_x$ includes a fluorine moiety. In certain embodiments, more than one $R_x$ includes a fluorine moiety. In certain embodiments, more than one $R_x$ includes the same fluorine moiety.

Certain preferred additives are represented by

Formula (A):

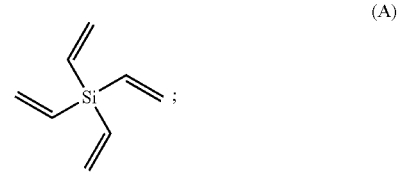

(A)

Formula (B):

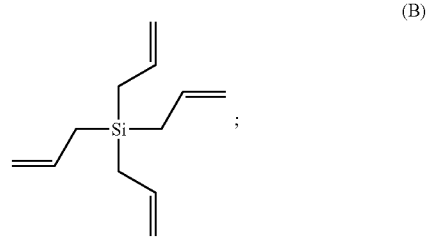

(B)

Formula (C):

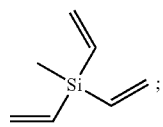
(C)

Formula (E):

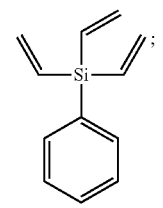
(E)

Formula (F):

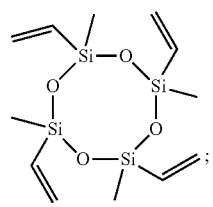
(F)

Formula (G):

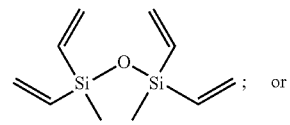
(G)

; or

Formula (H):

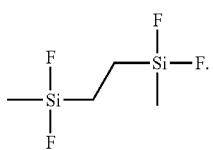
(H)

Embodiments of the invention include liquid electrolytes formulated from a mixture or solution that includes a lithium salt, a solvent, and an additive as disclosed herein. Embodiments of the invention include the liquid electrolyte as formulated and such liquid electrolytes that have undergone multiple charge/discharge cycles. Embodiments of the invention include the methods of making the liquid electrolytes disclosed herein, in the formulations disclosed herein, and the methods of making lithium ion batteries having the liquid electrolytes disclosed herein as constituents.

Other aspects and embodiments of the invention are also contemplated. The foregoing summary and the following detailed description are not meant to restrict the invention to any particular embodiment but are merely meant to describe some embodiments of the invention.

DETAILED DESCRIPTION OF THE INVENTION

Figure 1:
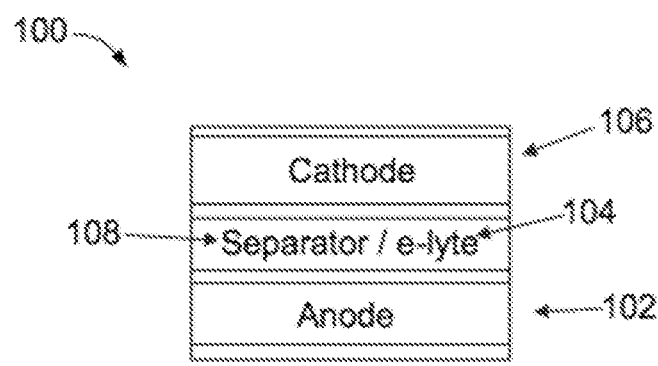
FIG. 1 illustrates a lithium ion battery implemented in accordance with an embodiment of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The term "capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counter electrode. For example, specific capacity can be measured upon discharge at a rate of about 0.05 C (e.g., about 8.75 mA/g) from 4.45 V to 3.0 V versus a Li/Li$^+$ counter electrode. Other discharge rates and other voltage ranges also can be used, such as a rate of about 0.1 C (e.g., about 17.5 mA/g), or about 0.5 C (e.g., about 87.5 mA/g), or about 1.0 C (e.g., about 175 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "coulombic efficiency" is sometimes abbreviated herein as CE and refers the efficiency with which charge is transferred in a given cycle.

The term "rated charge voltage" refers to an upper end of a voltage range during operation of a battery, such as a maximum voltage during charging, discharging, and/or cycling of the battery. In some aspects and some embodiments, a rated charge voltage refers to a maximum voltage upon charging a battery from a substantially fully discharged state through its (maximum) specific capacity at an initial cycle, such as the 1st cycle, the 2nd cycle, or the 3rd cycle. In some aspects and some embodiments, a rated charge voltage refers to a maximum voltage during operation of a battery to substantially maintain one or more of its performance characteristics, such as one or more of coulombic efficiency, retention of specific capacity, retention of energy density, and rate capability.

The term "rated cut-off voltage" refers to a lower end of a voltage range during operation of a battery, such as a minimum voltage during charging, discharging, and/or cycling of the battery. In some aspects and some embodiments, a rated cut-off voltage refers to a minimum voltage upon discharging a battery from a substantially fully charged state through its (maximum) specific capacity at an initial cycle, such as the 1st cycle, the 2nd cycle, or the 3rd cycle, and, in such aspects and embodiments, a rated cut-off voltage also can be referred to as a rated discharge voltage. In some aspects and some embodiments, a rated cut-off voltage refers to a minimum voltage during operation of a battery to substantially maintain one or more of its performance characteristics, such as one or more of coulombic efficiency, retention of specific capacity, retention of energy density, and rate capability.

The "maximum voltage" refers to the voltage at which both the anode and the cathode are fully charged. In an electrochemical cell, each electrode may have a given specific capacity and one of the electrodes will be the limiting electrode such that one electrode will be fully charged and the other will be as fully charged as it can be for that specific pairing of electrodes. The process of matching the specific capacities of the electrodes to achieve the desired capacity of the electrochemical cell is "capacity matching."

The term "NMC" refers generally to electrically active materials containing $LiNi_xMn_yCo_zO_w$, where $0<x<1$, $0<y<1$, $0<z<1$, $x+y+z=1$, and $0<w\leq2$. NMC cathode materials include, but are not limited to, electrically active materials containing $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, and $LiNi_{0.5}Mn_{0.3}Co_{0.2}O_2$.

The term "NCA" refers generally to cathode materials containing nickel, cobalt, and aluminum, such as $LiNi_{0.8}Co_{0.15}Al_{0.05}O_2$.

The term "moiety" refers generally to a distinct, structurally identifiable, structurally isolated, or structurally named portion of a molecule.

The term "vinyl" refers generally to a chemical group represented by the general molecular formula $RCH=CH_2$, where R is preferably an organic moiety.

The term "allyl" refers generally to a chemical group represented by the general molecular formula $RCH_2CH=CH_2$, where R is preferably an organic moiety.

The term "polymer" refers generally to a molecule whose structure is composed of multiple repeating units whose Jus t structure can be linear or branched.

The term "metalloid" refers generally to a chemical element with properties that are in-between or a mixture of those of metals and nonmetals, including boron (B), silicon (Si), germanium (Ge), arsenic (As), antimony (Sb), tellurium (Te), carbon (C), aluminum (Al), selenium (Se), polonium (Po), and astatine (At).

The term "post-transition metal" refers generally to a chemical element selected from the group consisting of gallium (Ga), indium (In), thallium (Th), tin (Sn), lead (Pb), bismuth (Bi), aluminum (Al), germanium (Ge), antimony (Sb), and polonium (Po).

To the extent certain battery characteristics can vary with temperature, such characteristics are specified at room temperature (about 30 degrees C.), unless the context clearly dictates otherwise.

Ranges presented herein are inclusive of their endpoints. Thus, for example, the range 1 to 3 includes the values 1 and 3 as well as intermediate values.

FIG. 1 illustrates a lithium ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes an electrolyte 104, which is disposed within and between the anode 102 and the cathode 106 and remains stable during high voltage battery cycling. The electrolyte 104 can be a liquid, a gel, or a solid electrolyte.

The operation of the battery 100 is based upon reversible intercalation and de-intercalation of lithium ions into and from host materials of the anode 102 and the cathode 106. Other implementations of the battery 100 are contemplated, such as those based on conversion chemistry. Referring to FIG. 1, the voltage of the battery 100 is based on redox potentials of the anode 102 and the cathode 106, where lithium ions are accommodated or released at a lower potential in the former and a higher potential in the latter. To allow both a higher energy density and a higher voltage platform to deliver that energy, the cathode 106 includes an active cathode material for high voltage operations at or above 4.3V.

Examples of suitable high voltage cathode materials include phosphates, fluorophosphates, fluorosulfates, fluorosilicates, spinels, lithium-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides. Examples of suitable anode materials include conventional anode materials used in lithium ion batteries, such as lithium, graphite ("$Li_xC_6$"), and other carbon, silicate, or oxide-based anode materials.

Figure 2:
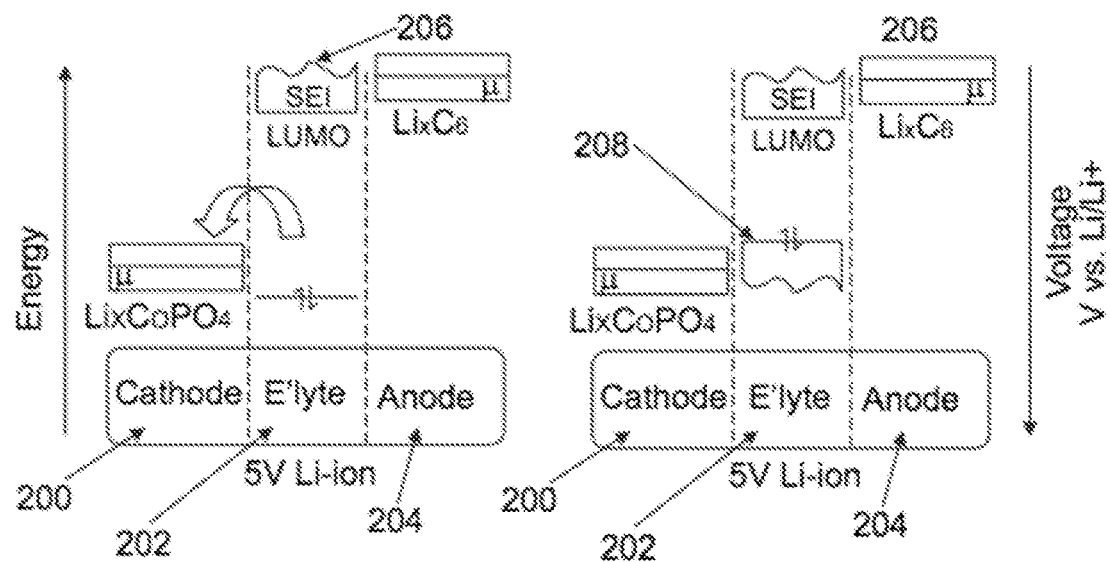
FIG. 2 illustrates the operation of a lithium ion battery and a graphical representation of an illustrative non-limiting mechanism of action of an electrolyte including an additive compound, according to an embodiment of the invention.

FIG. 2 illustrates operation of a lithium ion battery and an illustrative, non-limiting mechanism of action of an improved electrolyte, according to an embodiment of the invention. Without being bound by a particular theory not recited in the claims, the inclusion of one or more stabilizing additive compounds in an electrolyte solution can, upon operation of the battery (e.g., during conditioning thereof), passivate a high voltage cathode material, thereby reducing or preventing reactions between bulk electrolyte components and the cathode material that can degrade battery performance.

Referring to FIG. 2, a liquid electrolyte 202 includes a base electrolyte, and, during initial battery cycling, components within the base electrolyte can assist in the in-situ formation of a protective film (in the form of a solid electrolyte interface ("SEI") 206) on or next to an anode 204. The anode SEI 206 can inhibit reductive decomposition of the high voltage electrolyte 202. Preferably, and without being bound by theory not recited in the claims, for operation at voltages at or above 4.2 V, the liquid electrolyte 202 can also include additives that can assist in the in-situ formation of a protective film (in the form of a SEI 208 or another derivative) on or next to a cathode 200. The cathode SEI 208 can inhibit oxidative decomposition of the high voltage electrolyte 202 that can otherwise occur during high voltage operations. As such, the cathode SEI 208 can inhibit oxidative reactions in a counterpart manner to the inhibition of reductive reactions by the anode SEI 206. In the illustrated embodiment, the cathode SEI 208 can have a thickness in the sub-micron range, and can include one or more chemical elements corresponding to, or derived from, those present in one or more additives, such as silicon or other heteroatom included in one or more additives. Advantageously, one or more additives can preferentially passivate the cathode 200 and can selectively contribute towards film formation on the cathode 200, rather than the anode 204. Such preferential or selective film formation on the cathode 200 can impart stability against oxidative decomposition, with little or no additional film formation on the anode 204 (beyond the anode SEI 206) that can otherwise degrade battery performance through resistive losses. More generally, one or more additives can decompose below a redox potential of the cathode material and above a redox potential of SEI formation on the anode 204.

Without being bound by a particular theory not recited in the claims, the formation of the cathode SEI 208 can occur through one or more of the following mechanisms: (1) the additive compound(s) can react to form the cathode SEI 208, which inhibits further oxidative decomposition of electrolyte components; (2) the additive compound(s) or its reaction product(s) form or improve the quality of a passivation film on the cathode or anode; (3) the additive compounds can form an intermediate product, such as a complex with $LiPF_6$ or a cathode material, which intermediate product then forms the cathode SEI 208 that inhibits further oxidative decomposition of electrolyte components; (4) the additive compounds can form an intermediate product, such as a complex with $LiPF_6$, which then reacts during initial charging. The resulting product can then further react during initial charging to form the cathode SEI 208, which inhibits further oxidative decomposition of electrolyte components; (5) the additive compounds can stabilize the cathode material by preventing metal ion dissolution.

Other mechanisms of action of the electrolyte 202 are contemplated, according to an embodiment of the invention. For example, and in place of, or in combination with, forming or improving the quality of the cathode SEI 208, one or more additives or a derivative thereof (e.g., their reaction product) can form or improve the quality of the anode SEI 206, such as to reduce the resistance for lithium ion diffusion through the anode SEI 206. As another example, one or more additives or a derivative thereof (e.g., their reaction product) can improve the stability of the electrolyte 202 by chemically reacting or forming a complex with other electrolyte components. As a further example, one or more additives or a derivative thereof (e.g., their reaction product) can scavenge decomposition products of other electrolyte components or dissolved electrode materials in the electrolyte 202 by chemical reaction or complex formation. Any one or more of the cathode SEI 208, the anode SEI 206, and the other reaction products or complexes can be viewed as derivatives, which can include one or more chemical elements corresponding to, or derived from, those present in one or more additives, such as a heteroatom included in the additives.

Liquid electrolytes according to some embodiments of the invention can be formed by starting with a conventional, or base, electrolyte and mixing in additives according the embodiments disclosed herein. The resulting liquid electrolyte can have properties particularly suited for operation at high voltage, high temperature, or both. The base electrolyte can include one or more solvents and one or more salts, such as lithium-containing salts in the case of lithium ion batteries. Examples of suitable solvents include non-aqueous electrolyte solvents for use in lithium ion batteries, including carbonates, such as ethylene carbonate, dimethyl carbonate, ethyl methyl carbonate, propylene carbonate, methyl propyl carbonate, and diethyl carbonate; sulfones; silanes; nitriles; esters; ethers; and combinations thereof. The base electrolyte can also include additional small molecule additives.

An amount of an additive also can be expressed in terms of a ratio of the number of moles of the additive per unit surface area of either, or both, electrode materials. For example, an amount of a compound can be in the range of about $10^{-7}$ mol/m$^2$ to about $10^{-2}$ mol/m$^2$, such as from about $10^{-7}$ mol/m$^2$ to about $10^{-5}$ mol/m$^2$, from about $10^{-5}$ mol/m$^2$ to about $10^{-3}$ mol/m$^2$, from about $10^{-6}$ mol/m$^2$ to about $10^{-4}$ mol/m$^2$, or from about $10^{-4}$ mol/m$^2$ to about $10^{-2}$ mol/m$^2$. As further described below, a additive can be consumed or can react, decompose, or undergo other modifications during initial battery cycling. As such, an amount of a compound can refer to an initial amount of the compound used during the formation of the liquid electrolyte solutions, or can refer to an initial amount of the additive within the electrolyte solution prior to battery cycling (or prior to any significant amount of battery cycling).

Resulting performance characteristics of a battery can depend upon the identity of a particular additive used to form the liquid electrolyte solution, an amount of the additive used, and, in the case of a combination of multiple additives, a relative amount of each additive within the combination. Accordingly, the resulting performance characteristics can be fine-tuned or optimized by proper selection of the additive(s) and adjusting amounts of the additive(s) in the electrolyte formulas.

Preparing the liquid electrolyte solution can be carried out using a variety of techniques, such as by mixing the base electrolyte and the additives, dispersing the additives within the base electrolyte, dissolving the additives within the base electrolyte, or otherwise placing these components in contact with one another. The additives can be provided in a liquid form, a powdered form (or another solid form), or a combination thereof. The additives can be incorporated in the electrolyte solutions prior to, during, or subsequent to battery assembly.

The electrolyte solutions described herein can be used for a variety of batteries containing a high voltage cathode or a low voltage cathode, and in batteries operated at high temperatures. For example, the electrolyte solutions can be substituted in place of, or used in conjunction with, conventional electrolytes for lithium ion batteries for operations at or above 4.3 V. In particular, these additives are useful for lithium ion batteries containing NMC and NCA active materials.

Batteries having the liquid electrolyte solutions can be conditioned by cycling prior to commercial sale or use in commerce. Such conditioning can include, for example, providing a battery, and cycling such battery through at least 1, at least 2, at least 3, at least 4, or at least 5 cycles, each cycle including charging the battery and discharging the battery at a rate of 0.05 C (e.g., a current of 8.75 mA/g) between 4.45V and 3.0V (or another voltage range) versus a reference counter electrode, such as a graphite anode. Charging and discharging can be carried out at a higher or lower rate, such as at a rate of 0.1 C (e.g., a current of 17.5 mA/g), at a rate of 0.5 C (e.g., a current of 87.5 mA/g), or at a rate of 1 C (e.g., a current of 175 mA/g). Typically a battery is conditioned with 1 cycle by charging at 0.05 C rate to 4.45V followed by applying constant voltage until the current reaches 0.02 C, and then discharging at 0.05 C rate to 3V.

The an amount of a particular additive can be expressed in terms of a weight percent of the additive relative to a total weight of the liquid electrolyte solution (or wt. %). For example, an amount of an additive can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %, and, in the case of a combination of multiple additives, a total amount of the additive can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %.

In certain embodiments of the invention, the additive is present at an amount that is significantly lower than the amount of electrolyte salt present in the electrolyte formulation. The amount of additive can be expressed as a weight percent of the total weight of the electrolyte formulation. In certain embodiments of the invention, the concentration of additive in the electronic formulation is less than or equal to the concentration at which the additive would be at the saturation point in the electrolyte solvent. In certain embodiments of the invention, the concentration of additive in the electronic formulation is less than or equal to about 10 weight percent, more preferably less than or equal to about 9 weight percent, more preferably less than or equal to about 8 weight percent, more preferably less than or equal to about 7 weight percent, more preferably less than or equal to about 6 weight percent, more preferably less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of each additive in the electronic formulation is equal to about 10.0 wt %, 9.9 wt. %, 9.8 wt. %, 9.7 wt. %, 9.6 wt. %, 9.5 wt. %, 9.4 wt. %, 9.3 wt. %, 9.2 wt. %, 9.1 wt. %, 9.0 wt. %, 8.9 wt. %, 8.8 wt. %, 8.7 wt. %, 8.6 wt. %, 8.5 wt. %, 8.4 wt. %, 8.3 wt. %, 8.2 wt. %, 8.1 wt. %, 8.0 wt. %, 7.9 wt. %, 7.8 wt. %, 7.7 wt. %, 7.6 wt. %, 7.5 wt. %, 7.4 wt. %, 7.3 wt. %, 7.2 wt. %, 7.1 wt. %, 7.0 wt. %, 6.9 wt. %, 6.8 wt. %, 6.7 wt. %, 6.6 wt. %, 6.5 wt. %, 6.4 wt. %, 6.3 wt. %, 6.2 wt. %, 6.1 wt. %, 6.0 wt. %, 5.9 wt. %, 5.8 wt. %, 5.7 wt. %, 5.6 wt. %, 5.5 wt. %, 5.4 wt. %, 5.3 wt. %, 5.2 wt. %, 5.1 wt. %, 5.0 wt. %, 4.9 wt. %, 4.8 wt. %, 4.7 wt. %, 4.6 wt. %, 4.5 wt. %, 4.4 wt. %, 4.3 wt. %, 4.2 wt. %, 4.1 wt. %, 4.0 wt. %, 3.9 wt. %, 3.8 wt. %, 3.7 wt. %, 3.6 wt. %, 3.5 wt. %, 3.4 wt. %, 3.3 wt. %, 3.2 wt. %, 3.1 wt. %, 3.0 wt. %, 2.9 wt. %, 2.8 wt. %, 2.7 wt. %, 2.6 wt. %, 2.5 wt. %, 2.4 wt. %, 2.3 wt. %, 2.2 wt. %, 2.1 wt. %, 2.0 wt. %, 1.9 wt. %, 1.8 wt. %, 1.7 wt. %, 1.6 wt. %, 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. %, 0.3 wt. %, 0.2 wt. %, or 0.1 wt. %. In certain embodiments of the invention, the concentration of additive in the electrolyte formulation is in the range of about 2.0 wt. % to about 0.5 wt. %.

According to certain embodiments of the invention, a stable metalloid or post-transitional metal core combined with a polymerizable organic moiety is used as an additive in electrolyte formulations. The metalloid or post-transition metal core is relatively chemically inert to impart electrochemical and temperature stability. The polymerizable organic moiety can form a network, such as a cross-linked polymeric network, at or near the electrodes or the separator. The network can be formed under electrochemical activation occurring during the formation cycles of a rechargeable lithium ion battery and/or during the operation cycles of a rechargeable lithium ion battery. The network can form at the surface of an electrode and/or within the pores of an electrode. The network can interact chemically with other compounds and reaction products within the lithium-ion battery to form a stable SEI. The compounds and reaction products include those that originate from the electrode(s) and those that originate from the electrolyte. Further, the network can protect the electrode(s) from potentially harmful compounds and/or reaction products that may be present in the battery or may be produced through the electrochemistry occurring the battery. Certain potentially reaction products may occur more readily when the battery is operated or stored at elevated temperature. The network can protect the electrode(s) from these harmful compounds as well.

Silicon is a preferred element among the metalloid elements suitable for use in the core of the additives according to certain embodiments of the invention. Silicon is relatively chemically inert and is relatively stable at high temperatures. Similarly, tin is a preferred element among the post-transition metal elements suitable for use in the core of the additives according to certain embodiments of the invention. Tin is relatively chemically inert and is relatively stable at high temperatures.

Vinyl moieties and allyl moieties are among the simplest of polymerizable organic moieties that can be included in the additives according to certain embodiments of the invention. Vinyl moieties and allyl moieties are sufficiently reactive to form the protective networks disclosed herein. Further, certain vinyl moieties and allyl moieties can be relatively structurally stable under the conditions present during electrochemical activation. That is, certain vinyl moieties and allyl moieties can maintain their structure such that they react in predictable ways from the intended reactive location. Vinyl moieties may be particularly preferred for this reason.

According to certain embodiments of the invention, the additive can be represented by the general formula M-R where M is a moiety that includes a metalloid or post-transition metal and R is an organic group that contains a polymerizable organic moiety such as vinyl or allyl. Preferably, the additive can be represented by the general formula $M-R_x$ where x is an integer from 1 to 5. That is, the additive has a metalloid or post-transition metal core and multiple organic groups that contain a polymerizable organic moiety such as vinyl or allyl. In some cases, the additive is a vinylsilane compound. That is, M includes silicon and R is an organic group that contains a vinyl moiety. More preferably, the vinylsilane compound has multiple organic groups that contain a vinyl moiety. That is, M includes silicon, $R_x$ is an organic group that contains a vinyl moiety, and x is an integer greater than 1. Even more preferably, the vinylsilane compound has at least three organic groups that contain a vinyl moiety. That is, M includes silicon, $R_x$ is an organic group that contains a vinyl moiety, and x is at least 3. In certain preferred embodiments, M includes silicon, $R_x$ is an organic group that contains a vinyl moiety, and x is 4.

In all of these general formulas in which $R_x$ is present, the organic group that contains a vinyl moiety can be the identical organic group for each "$R_x$" or it can be a different organic group for each "$R_x$". For these vinylsilanes, the distinguishing feature is that each of the "$R_x$" organic groups contains a vinyl moiety.

Preferred embodiments of the invention include electrolyte formulations for lithium ion batteries in which the electrolyte formulation includes a vinysilane additive. The vinylsilane additives are particularly useful in liquid electrolyte formulations, but may be useful in other electrolyte formulations.

The structure-activity relationship of certain embodiments of the inventive additives was investigated to determine: 1) the effect on battery performance of the number of vinyl moiety substitutions on a particular silane structure; 2) the effect on battery performance of replacing the vinyl substitutions with other unsaturated moieties, such as allyl; and 3) the importance of a silicon-containing central core in the additives. The results disclosed herein demonstrate that the combination of a vinyl moiety and a silicon core is essential to improving capacity retention as a function of cycle number in lithium ion batteries.

Without being bound by any hypothesis, mechanism, or mode of action not recited in the claims, the vinylsilanes disclosed herein likely improve capacity retention as a function of cycle number by participating in the solid electrolyte interphase (SEI) formation on the cathode, anode, or both. Further, the vinylsilanes disclosed herein likely improve capacity retention as a function of cycle number by scavenging for acidic reactive species and/or protonic reactive species, which decreases chain reactions of solvent and SEI decomposition caused by those reactive species.

Certain properties are preferred in the M-$R_x$ additives for use in electrochemical cells. For example, the additives preferably are: (i) either chemically resistant to oxidation and/or reduction under the cell conditions or, if not chemically resistant to oxidation and/or reduction, then the additives should react to form intermediates or products that form a stable SEI film on the anode, cathode, or both; (ii) sufficiently soluble and/or miscible in the liquid electrolyte solution at room temperature; and (iii) make the liquid electrolyte solution viscosity during battery operation not worse than without the additive.

The following examples and methods describe specific aspects of some embodiments of the invention to illustrate and provide a description for those of ordinary skill in the art. The examples and methods should not be construed as limiting the invention, as the examples and methods merely provide specific methodology useful in understanding and practicing some embodiments of the invention.

One example of an additive represented by represented by the general formula M-$R_x$, where x is an integer from 1 to 5, is tetravinylsilane, shown below in Formula (A):

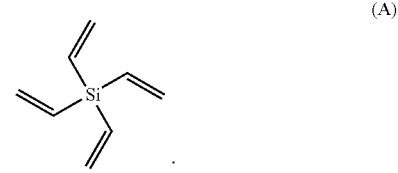

(A)

Another example of an additive represented by the general formula M-$R_x$, where x is an integer from 1 to 5, is tetraallylsilane, shown below in Formula (B):

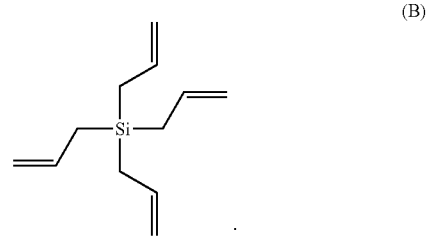

(B)

Another example of an additive represented by the general formula M-$R_x$, where x is an integer from 1 to 5, is trivinylmethylsilane, shown below in Formula (C):

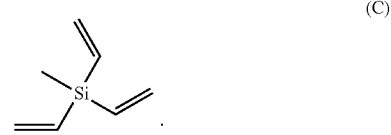

(C)

Another example of an additive represented by the general formula M-$R_x$, where x is an integer from 1 to 5, is tetravinyltin, shown below in Formula (D):

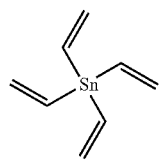

(D)

Another example of an additive represented by the general formula M-R$_x$, where x is an integer from 1 to 5, is trivinylphenylsilane, shown below in Formula (E):

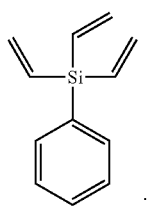

(E)

Another example of an additive represented by the general formula M-R$_x$, where x is an integer from 1 to 5, is 2,4,6,8-tetramethyl-2,4,6,8-tetravinylcyclotetrasiloxane, shown below in Formula (F):

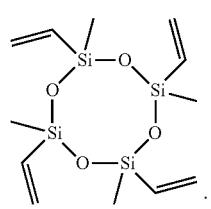

(F)

Another example of an additive represented by the general formula M-R$_x$, where x is an integer from 1 to 5, is 1,3-dimethyl tetravinyldisiloxane, shown below in Formula (G):

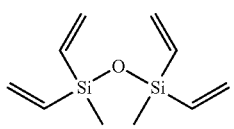

(G)

The additives according to Formula (F) and Formula (G) demonstrate that multiple M-R$_x$ moieties may be present in a single additive. In other words, according to certain embodiments of the invention, additives can be represented by the formula (M-R$_x$)$_y$ where x is an integer from 1 to 5 and y is an integer from 1 to 6. The organic group that contains a vinyl moiety can be the identical organic group for each "R$_x$" or it can be a different organic group for each "R$_x$". For these vinylsilanes, the distinguishing feature is that each of the "R$_x$" organic groups contains a vinyl moiety. In the additive (F), for example, one R$_x$ is a vinyl moiety, another R$_x$ is a methyl, and another R$_x$ is an oxygen. The fourth available bonding site of the silicon core is bonded to an oxygen that is an R$_x$ of the neighboring M-R$_x$ moiety. Thus, the formula (M-R$_x$)$_y$ is generic to both additive (F) and additive (G) and multiple other possible vinylsilanes with repeating M-R$_x$ moieties.

In another embodiment of additives useful for operating high voltage and/or high temperature is an additive represented by the general formula M-R$_x$ where M is silicon, at least one R$_x$ is an organic group that contains a fluorine moiety, and x is an integer from 1 to 5. One example of such an additive is 1,2-bis(methyldifluorosilyl) ethane, shown below in Formula (H):

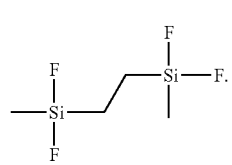

(H)

The organic group that contains a fluorine moiety can be the identical organic group for each "R$_x$" or it can be a different organic group for each "R$_x$". For these fluorosilanes, the distinguishing feature is that each of the "R$_x$" organic groups contains a fluorine moiety. In the additive (H), for example, two of R$_x$ are a fluorine moiety, another R$_x$ is a methyl, and another R$_x$ is an alkyl. The alkyl is bonded to an alkyl that is an R$_x$ of the neighboring M-R$_x$ moiety.

Methods

Battery Cell Assembly.

Battery cells were formed in a high purity Argon filled glove box (M-Braun, O$_2$ and humidity content<0.1 ppm). In the case of the cathode, a commercial LiNi$_{0.5}$Mn$_{0.3}$Co$_{0.2}$O$_2$ (referred to herein as NMC 532) or LiNi$_{0.8}$Co$_{0.15}$Al$_{0.05}$O$_2$ (referred to herein as NCA) cathode material was mixed with dry poly(vinylidene fluoride), carbon black powder, and liquid 1-methyl-2-pyrrolidinone to form a slurry. The resulting slurry was deposited on an aluminum current collector and dried to form a composite cathode film. In the case of the anode, a graphitic carbon was mixed with dry poly(vinylidene fluoride), carbon black powder, and liquid 1-methyl-2-pyrrolidinone to form a slurry. The resulting slurry was deposited on a copper current collector and dried to form a composite anode film. Each battery cell included the composite cathode film, a polypropylene separator, and composite anode film. A conventional liquid electrolyte formed from 1M of LiPF$_6$ in ethylene carbonate and ethyl methyl carbonate (EC:EMC=1:2) by volume was mixed with the desired weight percentage of an embodiment of the inventive additive and added to the battery cell. The battery cell was sealed and initially cycled at ambient temperature using 0.1 C charge to upper cutoff voltage (up to 4.35 or 4.45 V for NMC532; up to 4.1V or 4.4V for NCA) followed by constant voltage hold until the current dropped to 0.01 C and then discharged to 3.0V using 0.01 C constant current. The cycle was repeated one more time prior to high temperature cycling.

High Temperature Testing. Test batteries were cycled up to the desired voltage in an environment at a temperature of about 45 degrees Celsius using 0.5 C charge followed by constant voltage hold until the current dropped to 0.025 C and then discharged to 3.0V using 0.5 C constant current.

Table 1 summarizes certain data for the cycle life testing of some embodiments of the additives disclosed herein as compared to control and FIGS. 3 through 13 show the full cycle life testing.

Results

TABLE 1

Summary of additive performance compared to the control electrolyte

| Additives | Cell Voltage and Chemistry | 1st Cycle Capacity, 30° C. (mAh/g) | 1st Cycle CE (%) | 211th Cycle Capacity Retention, 45° C. (%) |
|---|---|---|---|---|
| None Control | 4.35V NMC532/Graphite | 184.5 | 84.9 | 65.3 |
| 0.5 wt % A | 4.35V NMC532/Graphite | 183.4 | 86.4 | 76.4 |
| 0.5 wt % B | 4.35V NMC532/Graphite | 173.3 | 80.6 | 65.0 |
| 0.5 wt % C | 4.35V NMC532/Graphite | 183.7 | 85.8 | 72.8 |
| 0.5 wt % D | 4.35V NMC532/Graphite | 179.9 | 83.4 | 49.5 |
| None Control | 4.45V NMC532/Graphite | 189.9 | 81.7 | 45.4 |
| 0.5 wt % A | 4.45V NMC532/Graphite | 195.0 | 86.5 | 70.7 |
| 2.0 wt % C | 4.45V NMC532/Graphite | 192.4 | 8632 | 68.1 |
| 0.5 wt % E | 4.45V NMC532/Graphite | 193.9 | 86.2 | 72.1 |
| 0.5 wt % F | 4.45V NMC532/Graphite | 193.1 | 86.6 | 67.9 |
| 0.5 wt % G | 4.45V NMC532/Graphite | 193.3 | 86.1 | 69.2 |
| 0.5 wt %H | 4.45V NMC532/Graphite | 186.5 | 85.6 | 64.7 |
| None Control | 4.1V NCA/Graphite | 164.5 | 82.8 | 71.7 |
| 0.5% wt % A | 4.1V NCA/Graphite | 161.1 | 83.6 | 76.7 |
| None Control | 4.4V NCA/Graphite | 193.6 | 81.8 | 69.4 |
| 0.5% wt % A | 4.4V NCA/Graphite | 195.0 | 82.9 | 75.7 |

Figure 3:
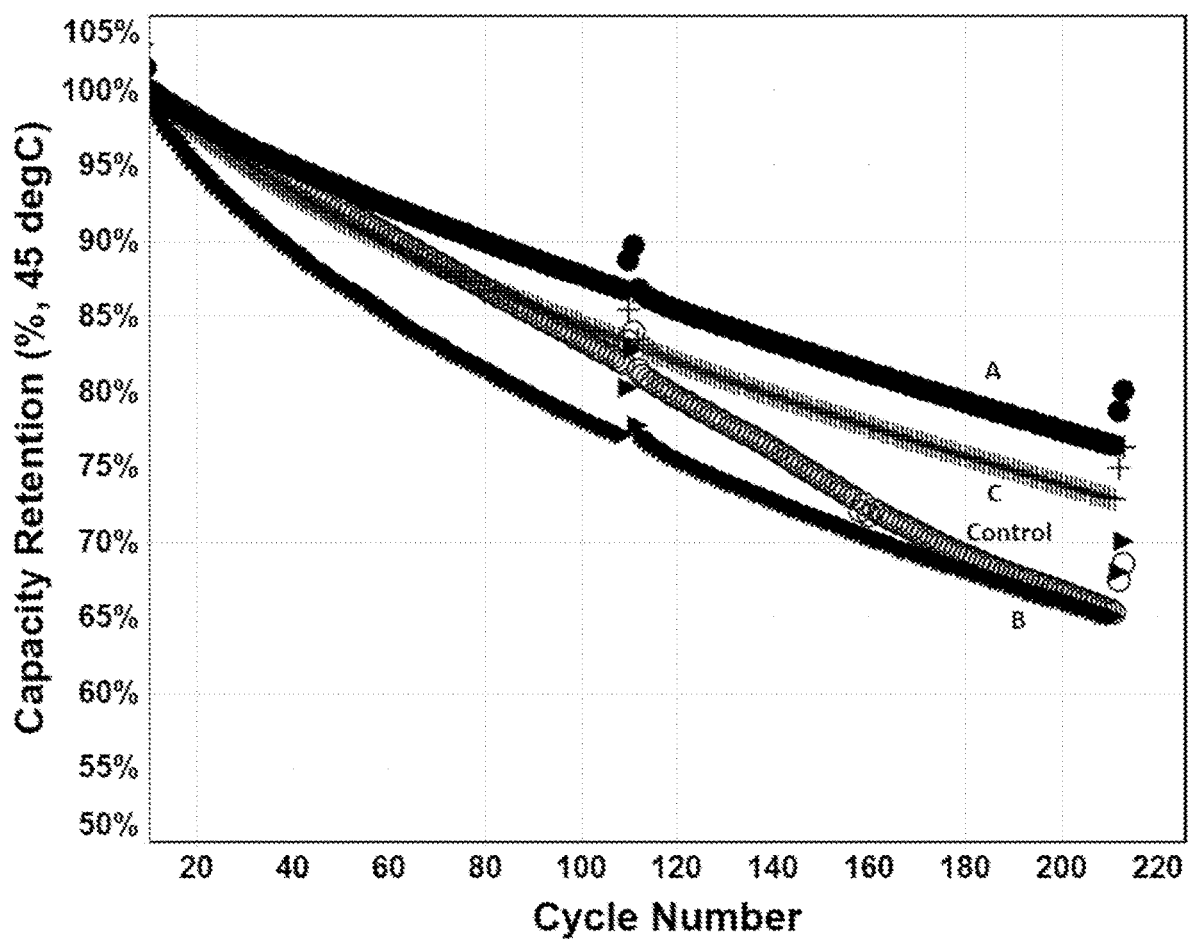
FIG. 3 illustrates electrochemical characterization of capacity retention versus cycle number for batteries containing liquid electrolytes having additives according to certain embodiments of the invention.

FIG. 3 illustrates electrochemical characterization of capacity retention versus cycle number for batteries containing liquid electrolytes having additives according to certain embodiments of the invention. In FIG. 3, the open circles represent the data from the battery containing the control electrolyte, which does not contain vinylsilane additives. The solid circles represent the data from the battery containing a liquid electrolyte having 0.5 wt % of the additive according to Formula (A). The solid triangles represent the data from the battery containing a liquid electrolyte having 0.5 wt % of the additive according to Formula (B). The crosses represent the data from the battery containing a liquid electrolyte having 0.5 wt % of the additive according to Formula (C). The charge/discharge cycling was conducted from 3V to 4.35V in an environment at 45 degrees Celsius. Each battery included a NMC532 composite cathode and a graphite composite anode.

FIG. 3 demonstrates performance differences related to additive structural and chemical composition. For example, the additive according to Formula (A) has four vinyl groups while the additive according to Formula (B) has four allyl groups. The capacity retention performance of the battery containing a liquid electrolyte having 0.5 wt % of the additive according to Formula (A) is significantly better than the capacity retention performance of the battery containing the control. Surprisingly, when vinyl groups were replaced by allyl groups (that is, the additive (A) versus the additive (B), the cycling performance of electrolyte having additive (B) was significantly worse and showed little or no benefit compared to the control electrolyte. These results indicate that vinyl group may be essential to forming a stable SEI under high voltage and high temperature conditions.

As another example of performance differences related to additive structural and chemical composition, the additive (A), which contains 4 vinyl moieties, demonstrated capacity retention performance superior to that of the additive (C), which contains 3 vinyl moieties. Both of these additives demonstrated capacity retention performance superior to that of additive (B) and control. This data supports the hypothesis that multiple vinyl groups can form a robust protective network on the electrode surface in high voltage batteries undergoing cycling in a high temperature environment.

Figure 4:
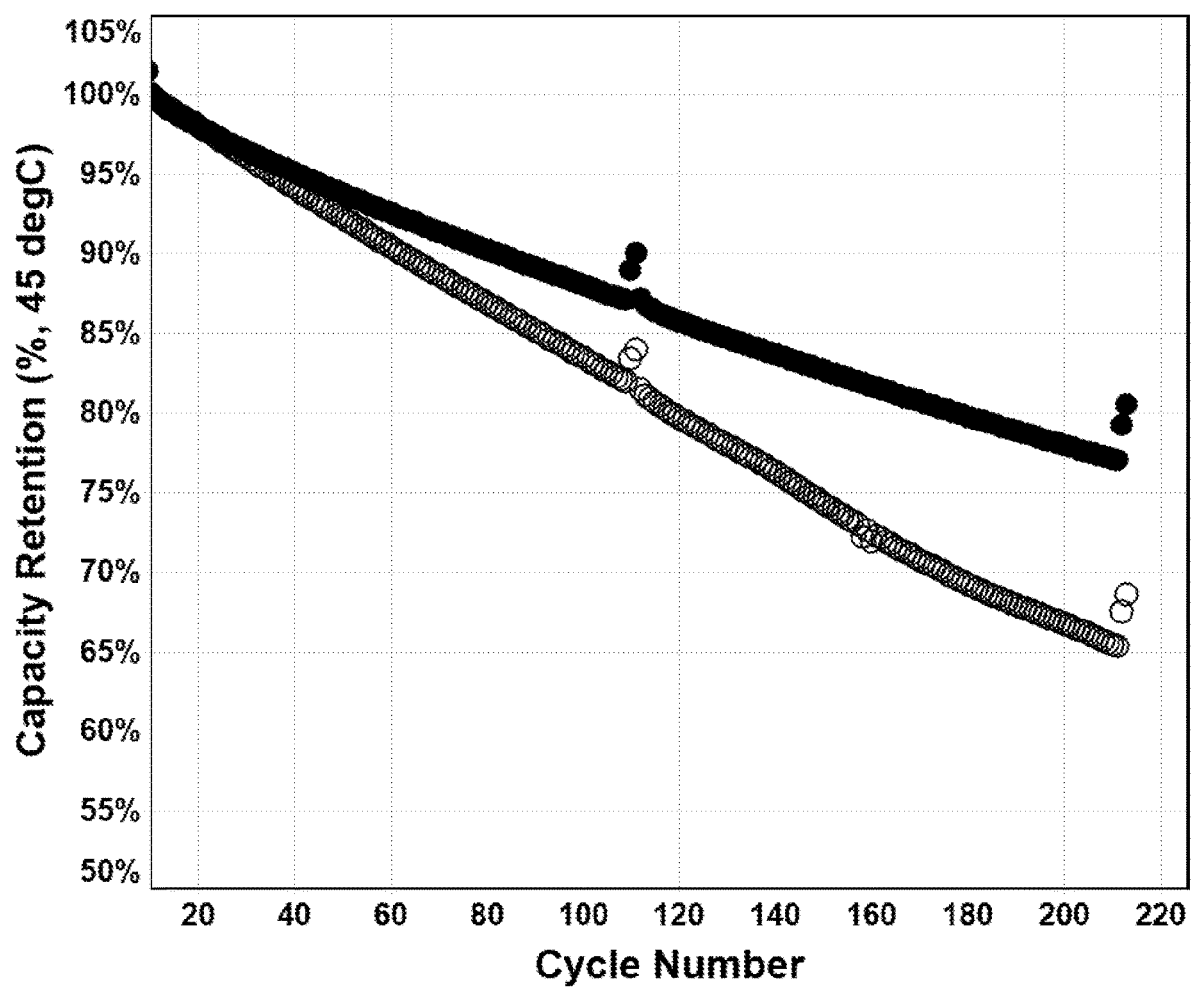
FIG. 4 illustrates electrochemical characterization of capacity retention versus cycle number for batteries containing liquid electrolytes having additives according to certain embodiments of the invention.

FIG. 4 illustrates electrochemical characterization of capacity retention versus cycle number for batteries containing liquid electrolytes having additives according to certain embodiments of the invention. In FIG. 4, the open circles represent the data from the battery containing the control electrolyte, which does not contain vinylsilane additives. The solid circles represent the data from the battery containing a liquid electrolyte having 0.5 wt % of the additive according to Formula (A). The charge/discharge cycling was conducted from 3V to 4.35V in an environment at 45 degrees Celsius. Each battery included a NMC532 composite cathode and a graphite composite anode.

Figure 5:
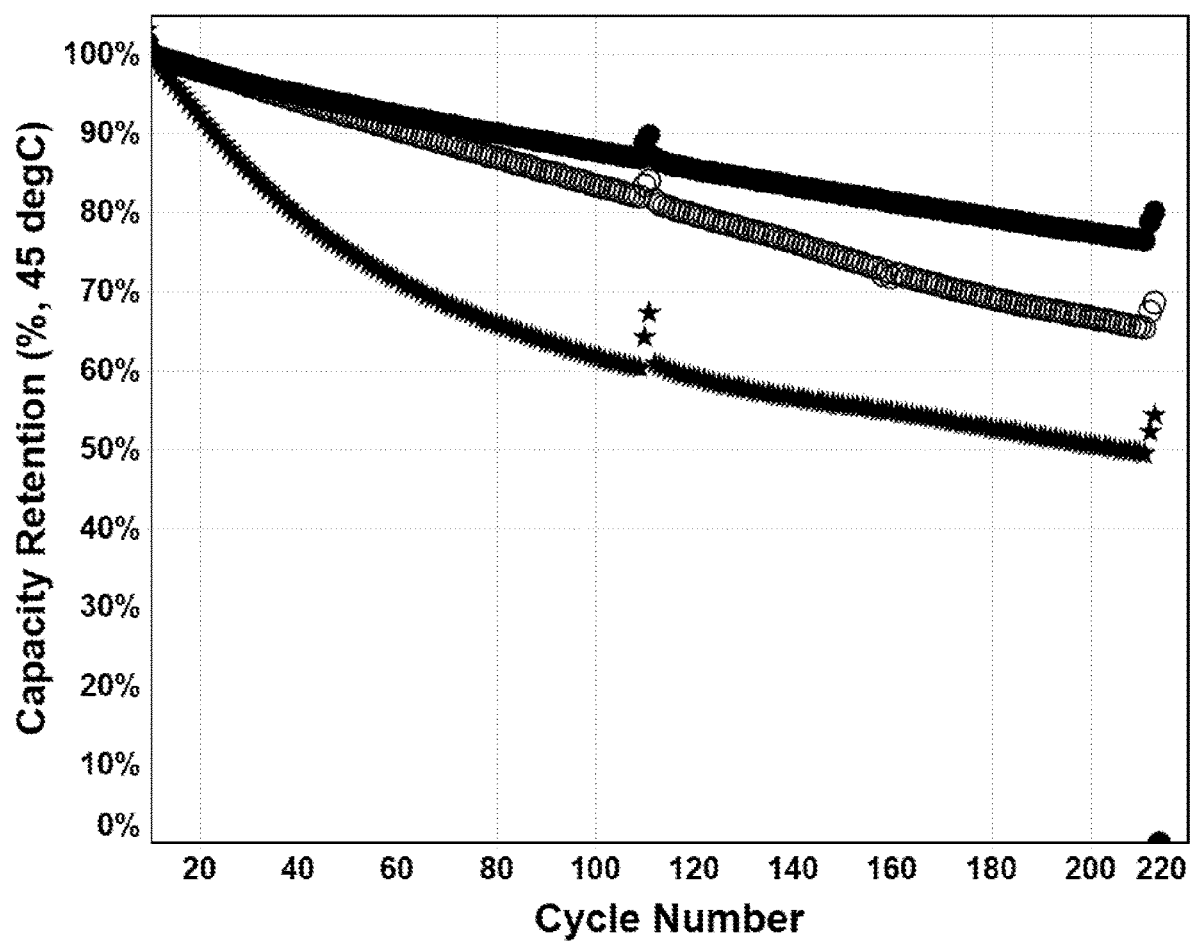
FIG. 5 illustrates electrochemical characterization of capacity retention versus cycle number for batteries containing liquid electrolytes having additives according to certain embodiments of the invention.

FIG. 5 illustrates electrochemical characterization of capacity retention versus cycle number for batteries containing liquid electrolytes having additives according to certain embodiments of the invention. In FIG. 5, the open circles represent the data from the battery containing the control electrolyte, which does not contain vinylsilane additives. The solid circles represent the data from the battery containing a liquid electrolyte having 0.5 wt % of the additive according to Formula (A) and the solid stars represent the data from the battery containing a liquid electrolyte having 0.5 wt % of the additive according to Formula (D). The charge/discharge cycling was conducted from 3V to 4.35V in an environment at 45 degrees Celsius. Each battery included a NMC532 composite cathode and a graphite composite anode. FIG. 5 also demonstrates performance differences related to additive structural and chemical composition. Formula (D) is identical to Formula (A), except that the core of the molecule is the post-transition metal tin rather than the metalloid silicon. There is a substantial performance difference between the battery having an electrolyte additive with a silicon core as compared to the battery having an electrolyte additive with a tin core. This data suggests that the silicon core is important in providing a robust protective network on the electrode surface in high voltage batteries undergoing cycling in a high temperature environment.

Figure 6:
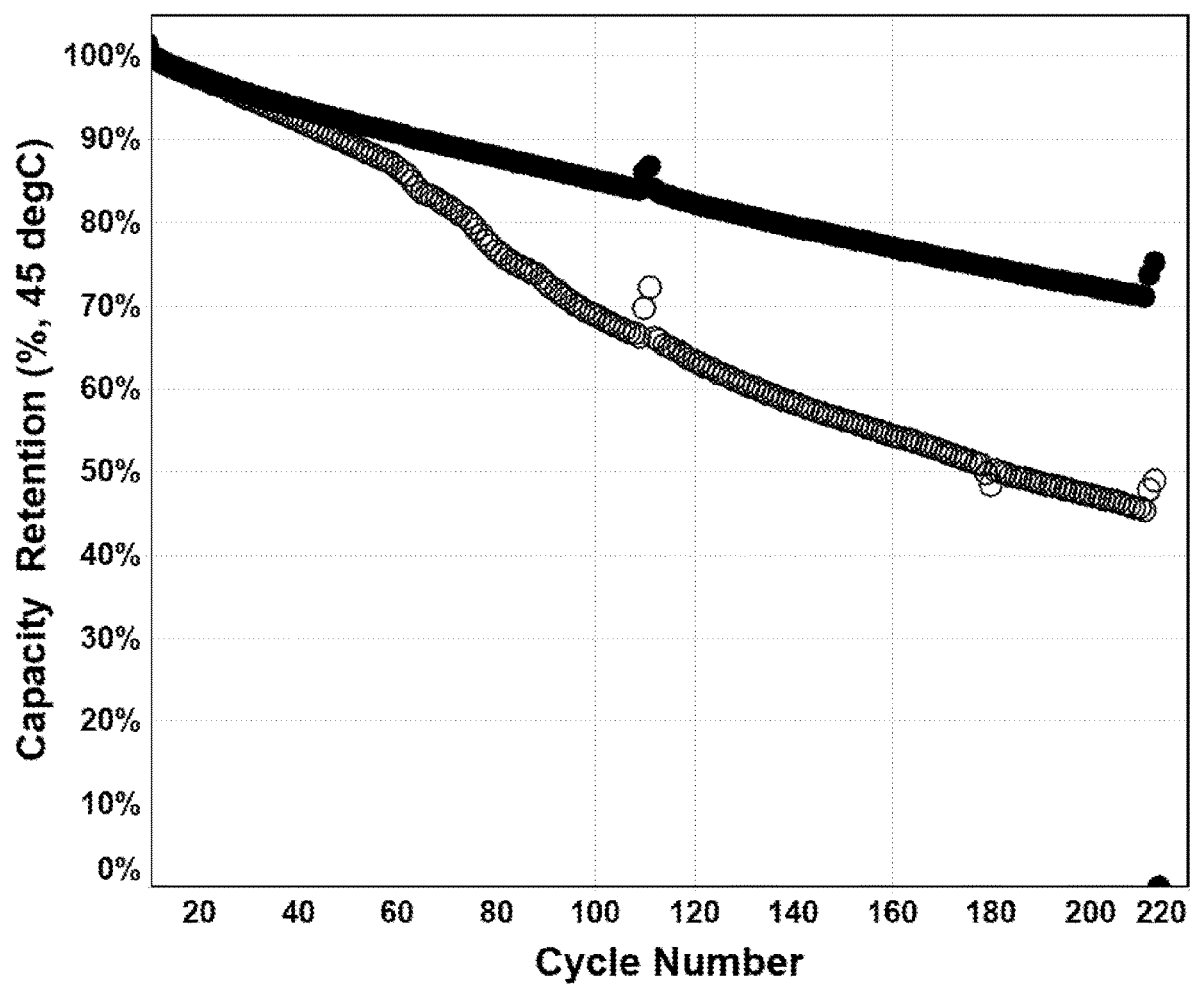
FIG. 6 illustrates electrochemical characterization of capacity retention versus cycle number for batteries containing liquid electrolytes having additives according to certain embodiments of the invention.

FIG. 6 illustrates electrochemical characterization of capacity retention versus cycle number for batteries containing liquid electrolytes having additives according to certain embodiments of the invention. In FIG. 6, the open circles represent the data from the battery containing the control electrolyte, which does not contain vinylsilane additives. The solid circles represent the data from the battery containing a liquid electrolyte having 0.5 wt % of the additive according to Formula (A). The charge/discharge cycling was conducted from 3V to 4.45V in an environment at 45 degrees Celsius. Each battery included a NMC532 composite cathode and a graphite composite anode. FIG. 6 tests the same systems those in FIG. 4, and shows that the additive according to Formula (A) performs in a similar fashion as compared to control at the higher voltage (in this case 4.45V as compared to 4.35V in FIG. 4). It is unexpected that an additive would be able to maintain (or even improve) its superior performance over control at an even higher voltage. It is further surprising that this superior performance over control is maintained (or improved) in the challenging high temperature environment.

Figure 7:
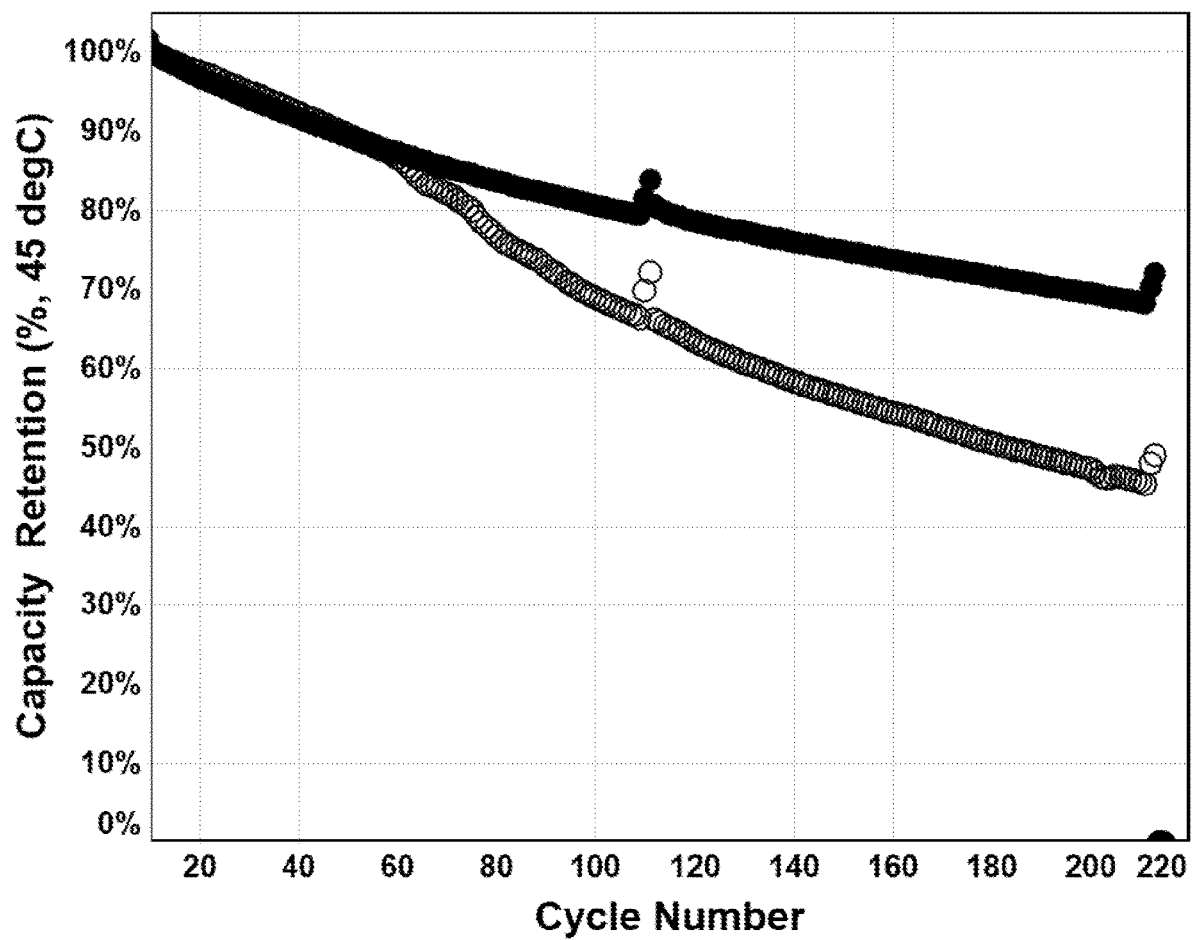
FIG. 7 illustrates electrochemical characterization of capacity retention versus cycle number for batteries containing liquid electrolytes having additives according to certain embodiments of the invention.

FIG. 7 illustrates electrochemical characterization of capacity retention versus cycle number for batteries containing liquid electrolytes having additives according to certain embodiments of the invention. In FIG. 7, the open circles represent the data from the battery containing the control electrolyte, which does not contain vinylsilane additives. The solid circles represent the data from the battery containing a liquid electrolyte having 2 wt % of the additive according to Formula (C). The charge/discharge cycling was conducted from 3V to 4.45V in an environment at 45 degrees Celsius. Each battery included a NMC532 composite cathode and a graphite composite anode. Comparing FIG. 7 to FIG. 3, one can see that a higher concentration of the additive C results in improved performance compared to control under the higher voltage conditions of FIG. 7. This result seems to confirm that increasing the number of vinyl groups, either through the structure of the additive or through the concentration of the additive, is beneficial to the high voltage and high temperature performance of lithium ion batteries.

Figure 8:
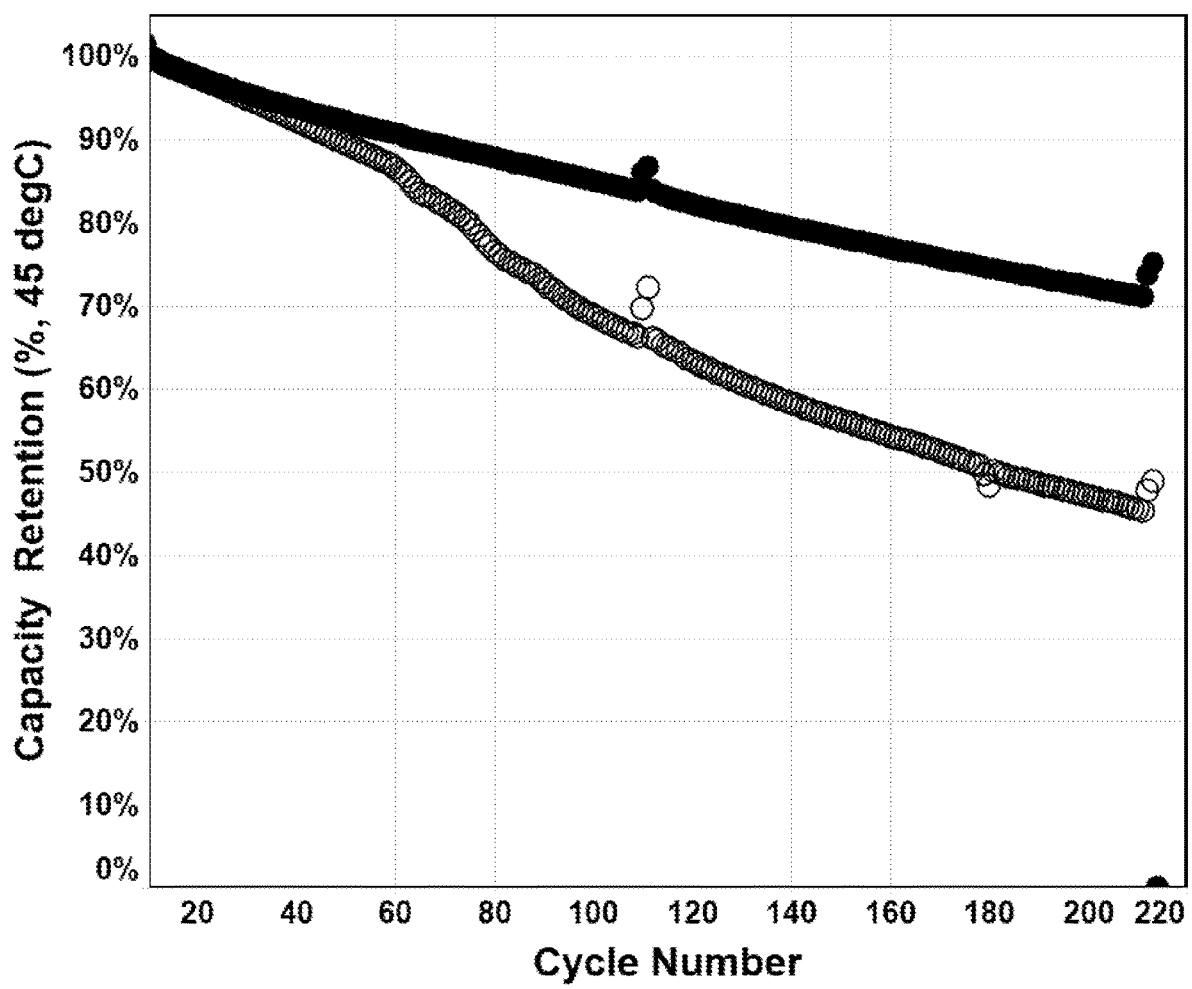
FIG. 8 illustrates electrochemical characterization of capacity retention versus cycle number for batteries containing liquid electrolytes having additives according to certain embodiments of the invention.

FIG. 8 illustrates electrochemical characterization of capacity retention versus cycle number for batteries containing liquid electrolytes having additives according to certain embodiments of the invention. In FIG. 8, the open circles represent the data from the battery containing the control electrolyte, which does not contain vinylsilane additives. The solid circles represent the data from the battery containing a liquid electrolyte having 0.5 wt % of the additive according to Formula (E). The charge/discharge cycling was conducted from 3V to 4.45V in an environment at 45 degrees Celsius. Each battery included a NMC532 composite cathode and a graphite composite anode.

Figure 9:
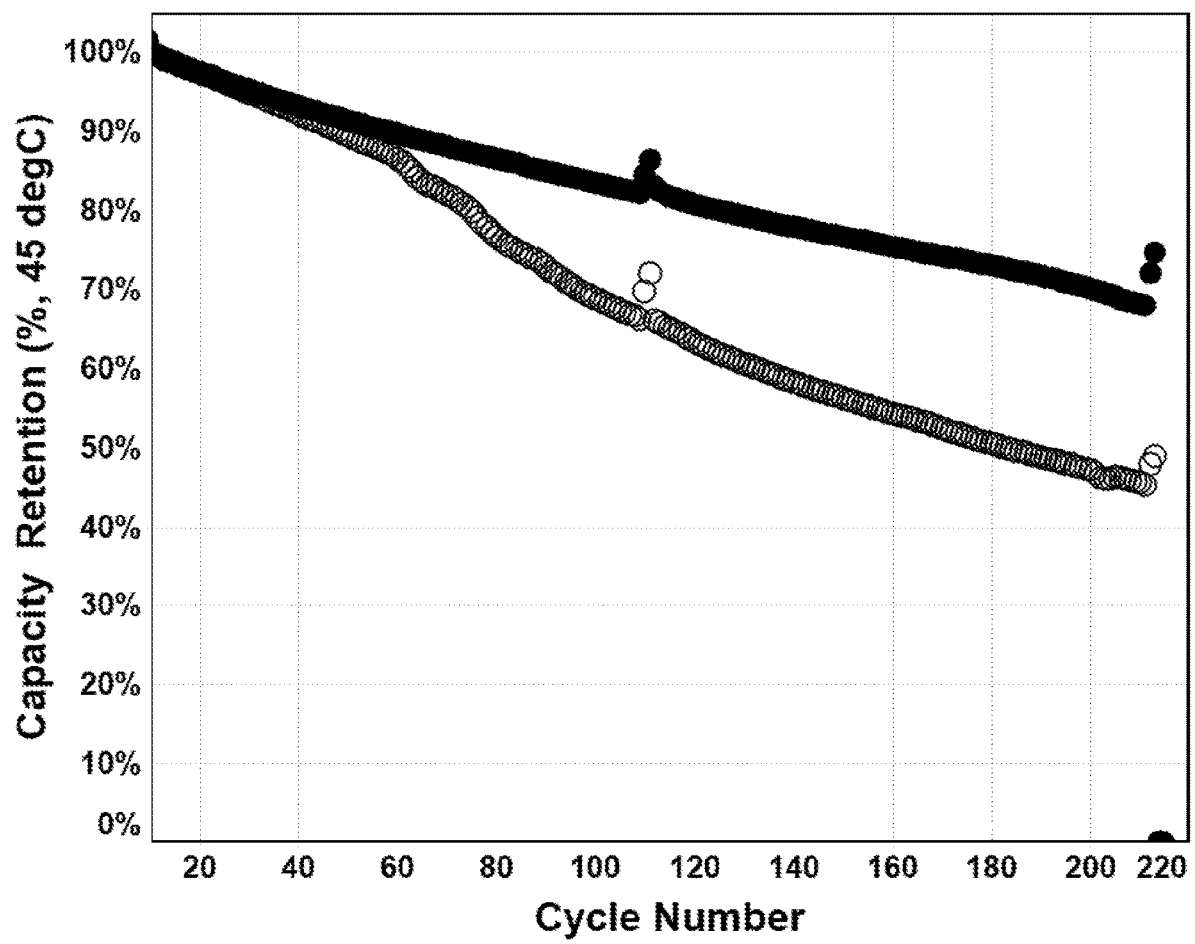
FIG. 9 illustrates electrochemical characterization of capacity retention versus cycle number for batteries containing liquid electrolytes having additives according to certain embodiments of the invention.

FIG. 9 illustrates electrochemical characterization of capacity retention versus cycle number for batteries containing liquid electrolytes having additives according to certain embodiments of the invention. In FIG. 9, the open circles represent the data from the battery containing the control electrolyte, which does not contain vinylsilane additives. The solid circles represent the data from the battery containing a liquid electrolyte having 0.5 wt % of the additive according to Formula (F). The charge/discharge cycling was conducted from 3V to 4.45V in an environment at 45 degrees Celsius. Each battery included a NMC532 composite cathode and a graphite composite anode.

Figure 10:
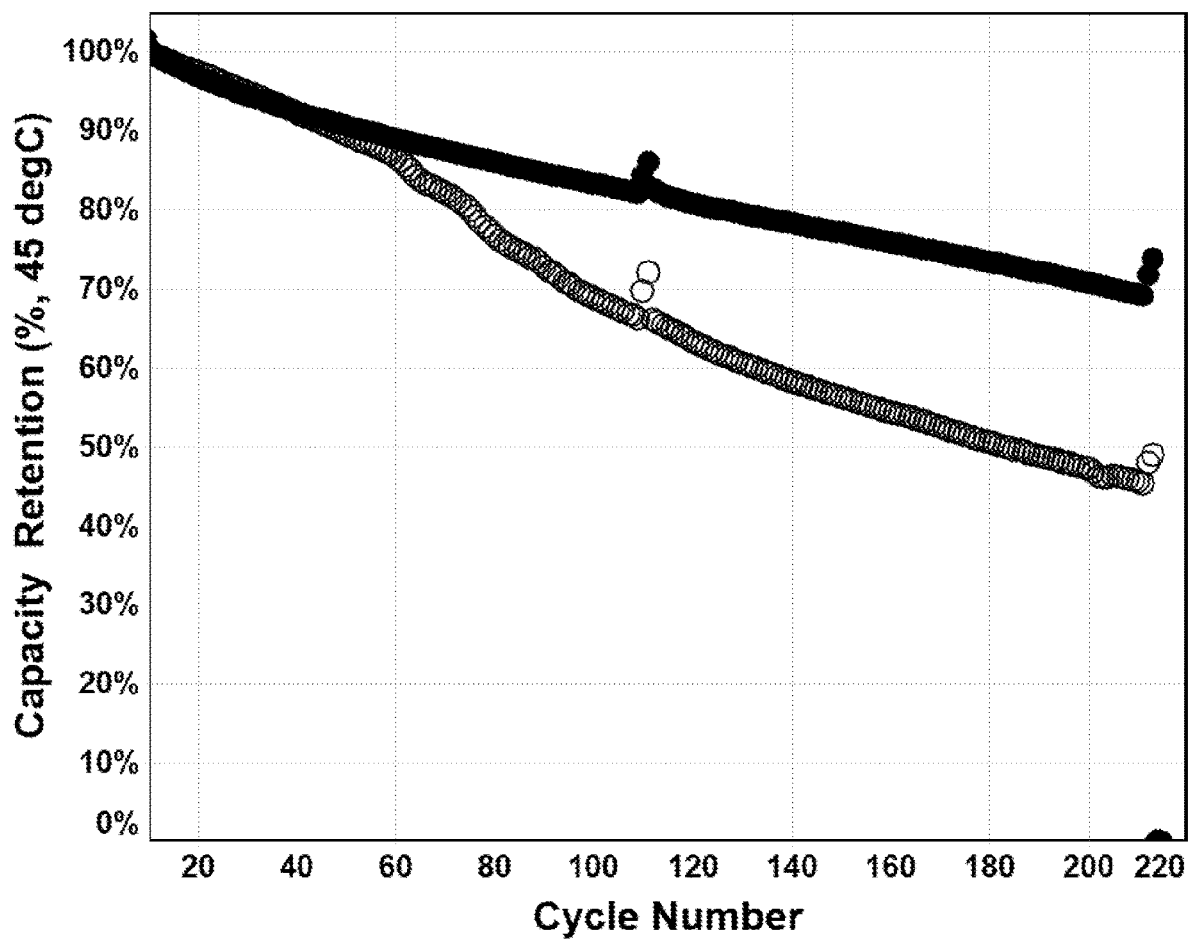
FIG. 10 illustrates electrochemical characterization of capacity retention versus cycle number for batteries containing liquid electrolytes having additives according to certain embodiments of the invention.

FIG. 10 illustrates electrochemical characterization of capacity retention versus cycle number for batteries containing liquid electrolytes having additives according to certain embodiments of the invention. In FIG. 10, the open circles represent the data from the battery containing the control electrolyte, which does not contain vinylsilane additives. The solid circles represent the data from the battery containing a liquid electrolyte having 0.5 wt % of the additive according to Formula (G). The charge/discharge cycling was conducted from 3V to 4.45V in an environment at 45 degrees Celsius. Each battery included a NMC532 composite cathode and a graphite composite anode.

FIGS. 8, 9 and 10 demonstrate that multiple vinylsilanes are capable of forming a robust protective network on the electrode surface in high voltage batteries undergoing cycling in a high temperature environment. The combination of the reactive vinyl moieties around a metalloid core forms an effective protection layer under electrochemical activation resulting in much improved battery performance even at high voltage and high temperature.

Figure 11:
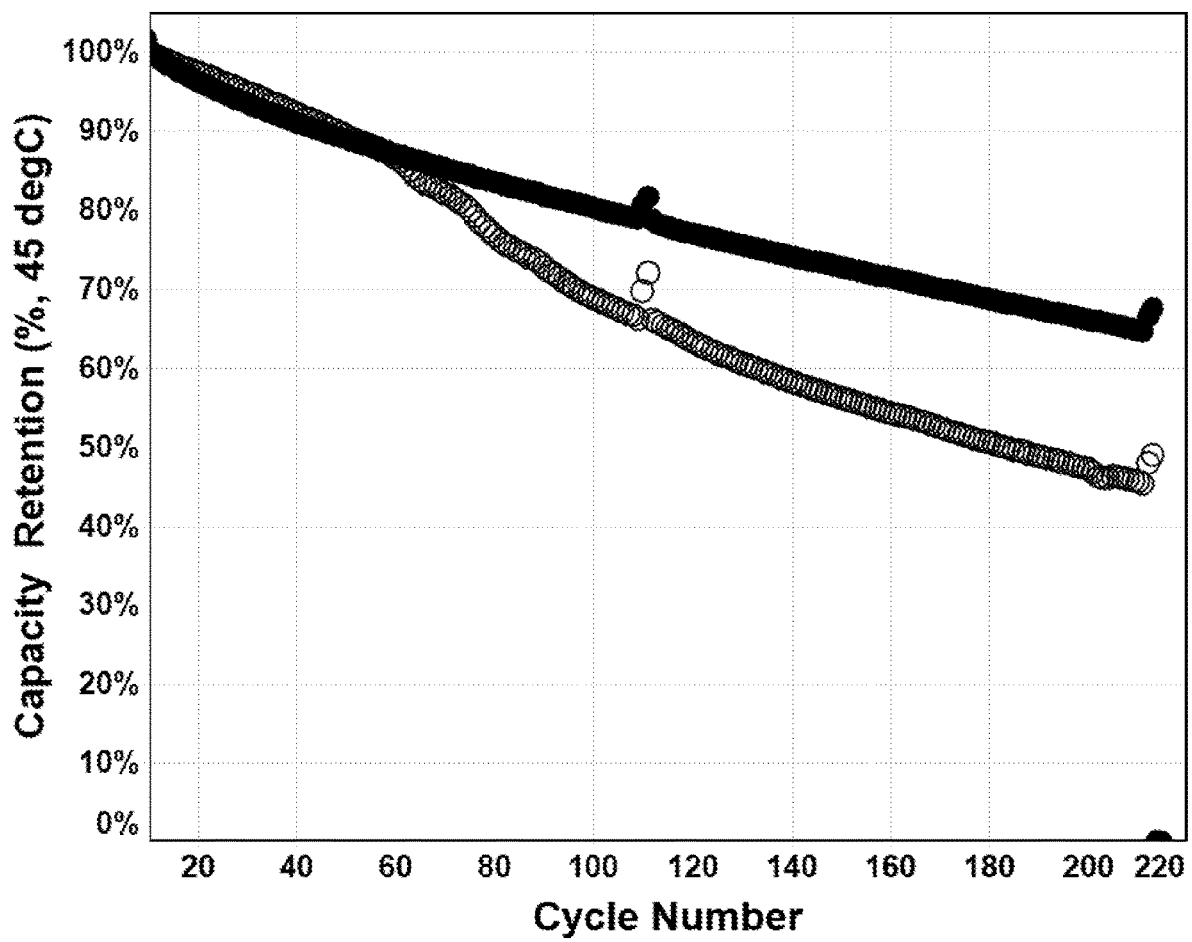
FIG. 11 illustrates electrochemical characterization of capacity retention versus cycle number for batteries containing liquid electrolytes having additives according to certain embodiments of the invention.

FIG. 11 illustrates electrochemical characterization of capacity retention versus cycle number for batteries containing liquid electrolytes having additives according to certain embodiments of the invention. In FIG. 11, the open circles represent the data from the battery containing the control electrolyte, which does not contain additives. The solid circles represent the data from the battery containing a liquid electrolyte having 0.5 wt % of the additive according to Formula (H). The charge/discharge cycling was conducted from 3V to 4.45V in an environment at 45 degrees Celsius. Each battery included a NMC532 composite cathode and a graphite composite anode.

Figure 12:
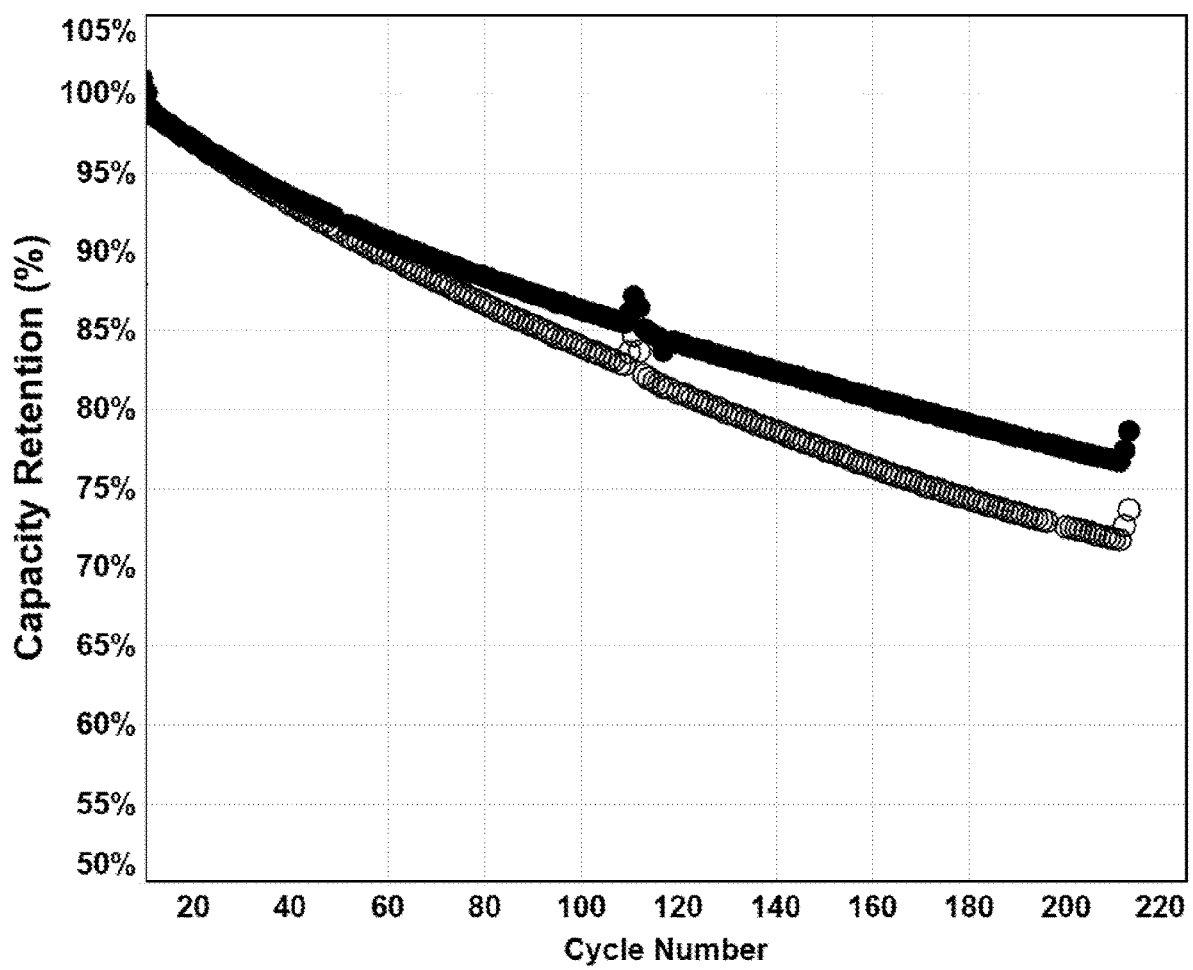
FIG. 12 illustrates electrochemical characterization of capacity retention versus cycle number for batteries containing liquid electrolytes having additives according to certain embodiments of the invention.
Figure 13:
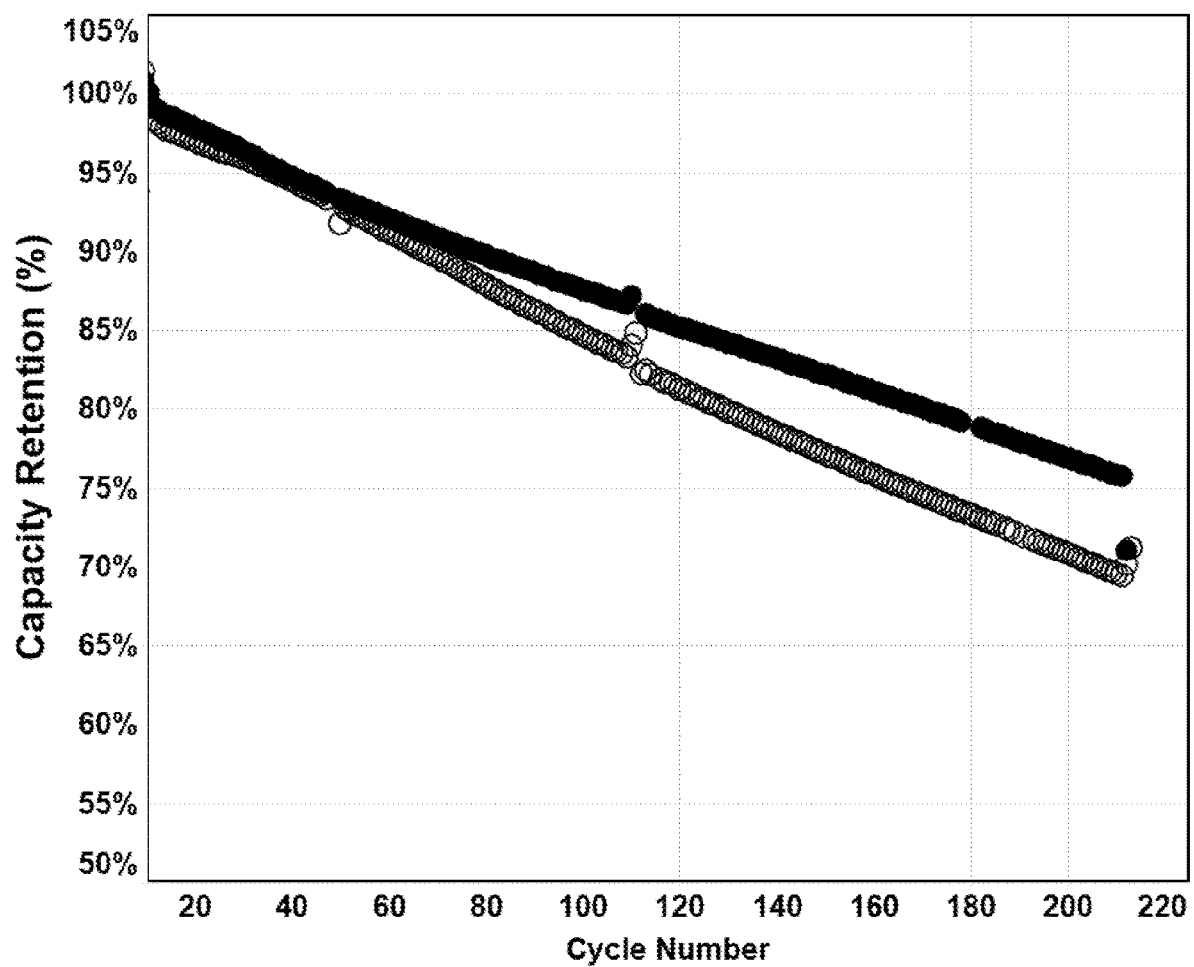
FIG. 13 illustrates electrochemical characterization of capacity retention versus cycle number for batteries containing liquid electrolytes having additives according to certain embodiments of the invention.

The performance improvements of vinylsilanes are also demonstrated in batteries having cathodes with NCA active materials. FIG. 12 illustrates electrochemical characterization of capacity retention versus cycle number for batteries containing liquid electrolytes having additives according to certain embodiments of the invention. In FIG. 12, the open circles represent the data from the battery containing the control electrolyte, which does not contain vinylsilane additives. The solid circles represent the data from the battery containing a liquid electrolyte having 0.5 wt % of the additive according to Formula (A). The charge/discharge cycling was conducted from 3V to 4.1V in an environment at 45 degrees Celsius. Each battery included a NCA composite cathode and a graphite composite anode. Similarly, in FIG. 13, the open circles represent the data from the battery containing the control electrolyte, which does not contain vinylsilane additives. The solid circles represent the data from the battery containing a liquid electrolyte having 0.5 wt % of the additive according to Formula (A). The charge/discharge cycling was conducted from 3V to 4.4V in an environment at 45 degrees Celsius. Each battery included a NCA composite cathode and a graphite composite anode.

The good performance of these electrolyte additives in lithium ion battery cells having cathode active materials including $LiNi_{0.8}Mn_{0.1}Co_{0.1}O_2$ or $LiNi_{0.8}Co_{0.15}Al_{0.05}O_2$ is significant because high nickel active materials (such as $LiNi_{0.8}Mn_{0.1}Co_{0.1}O_2$ or $LiNi_{0.8}Co_{0.15}Al_{0.05}O_2$) are desirable for many battery applications. These materials are used to create high-energy cathodes. Certain embodiments of the invention disclosed herein demonstrate good performance in this challenging high-energy environment. Prior to this disclosure, this type of performance has not been demonstrated or predicted for the additives disclosed herein.

The additives disclosed herein are particularly useful in electrochemical cells in this the rated charge voltage and/or maximum voltage of the cell is greater than 4.2V, greater than 4.3V, greater than 4.4V, greater than 4.5V, greater than 4.6V, greater than 4.7V, greater than 4.8V, and/or greater than 4.9V. These types of high voltage electrochemical cells include electrodes that a designed to reliably operate through multiple charge and discharge cycles at high voltages. The additives disclosed herein enable such high voltage operation with conventional electrolyte formulations, provided the additive is also present in the liquid electrolyte. Further, the additives are useful in such electrochemical cells when the cells are operated in a high temperature environment, such as an environment at a temperature of at least 45 degrees Celsius. Prior to this disclosure, this type of performance has not been demonstrated for the additives disclosed herein.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A lithium ion battery, comprising:
an anode;
a cathode represented by the formula $LiNi_aMn_bCo_cO_d$, wherein $0.5 \leq a < 1$, $0 < b < 0.5$, $0 < c < 0.5$, $a+b+c=1$, and $0 < d \leq 2$; and
a liquid electrolyte comprising a lithium salt, a solvent, and an additive, wherein the additive is tetravinylsilane, represented by Formula (A), and a concentration of the tetravinylsilane is at least 1 weight percent of a total weight of the liquid electrolyte:

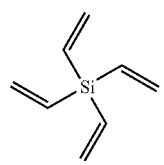

(A)

wherein tetravinylsilane is the only additive present in the liquid electrolyte, and the liquid electrolyte is free of fluorinated carbonates.

2. The lithium ion battery of claim 1, wherein the cathode is represented by the formula $LiNi_{0.6}Mn_{0.2}Co_{0.2}O_2$.

3. The lithium ion battery of claim 1, wherein the cathode is represented by the formula $LiNi_{0.8}Mn_{0.1}Co_{0.1}O_2$.

4. The lithium ion battery of claim 1, wherein the cathode is represented by the formula $LiNi_{0.5}Mn_{0.3}Co_{0.2}O_2$.

5. The lithium ion battery of claim 1, wherein a rated charge voltage of the battery is greater than 4.4 V.

6. The lithium ion battery of claim 1, wherein a concentration of the tetravinylsilane is less than 2 weight percent of a total weight of the liquid electrolyte.

7. The lithium ion battery of claim 1, wherein the concentration of the tetravinylsilane is at least 2 weight percent of the total weight of the liquid electrolyte.

8. A lithium ion battery, comprising:
an anode;
a cathode represented by the formula $LiNi_aMn_bCo_cO_d$, wherein $0.5 \leq a < 1$, $0 < b < 0.5$, $0 < c < 0.5$, $a+b+c=1$, and $0 < d \leq 2$; and
a liquid electrolyte comprising a lithium salt, a solvent, and an additive, wherein the additive is tetraallylsilane, represented by Formula (B), and a concentration of the tetraallylsilane is at least 1 weight percent of a total weight of the liquid electrolyte:

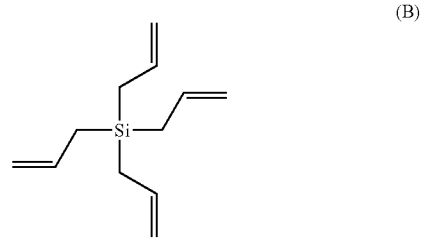

(B)

wherein tetraallylsilane is the only additive present in the liquid electrolyte, and the liquid electrolyte is free of fluorinated carbonates.

9. The lithium ion battery of claim 8, wherein the cathode is represented by one of the formula $LiNi_{0.5}Mn_{0.3}Co_{0.2}O_2$, the formula $LiNi_{0.6}Mn_{0.2}Co_{0.2}O_2$, or the formula $LiNi_{0.8}Mn_{0.1}Co_{0.1}O_2$.

10. The lithium ion battery of claim 8, wherein the concentration of the tetraallylsilane is at least 2 weight percent of the total weight of the liquid electrolyte.

11. A lithium ion battery, comprising:
an anode;
a cathode represented by the formula $LiNi_aCo_bAl_cO_2$, wherein $0.5 \leq a < 1$, $0 < b < 0.5$, $0 < c < 0.5$, and $a+b+c=1$; and
a liquid electrolyte comprising a lithium salt, a solvent, and an additive, wherein the additive is tetravinylsilane, represented by Formula (A), and a concentration of the tetravinylsilane is at least 1 weight percent of a total weight of the liquid electrolyte:

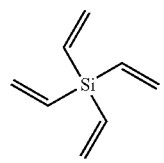

(A)

wherein tetravinylsilane is the only additive present in the liquid electrolyte, and the liquid electrolyte is free of fluorinated carbonates.

12. The lithium ion battery of claim 11, wherein the cathode is represented by the formula $LiNi_{0.8}Co_{0.15}Al_{0.05}O_2$.

13. The lithium ion battery of claim 11, wherein a rated charge voltage of the battery is greater than 4.4 V.

14. The lithium ion battery of claim 11, wherein the concentration of the tetravinylsilane is at least 2 weight percent of the total weight of the liquid electrolyte.

* * * * *